United States Patent [19]

Yasutake

[11] Patent Number: 5,729,249
[45] Date of Patent: *Mar. 17, 1998

[54] TOUCH SENSITIVE INPUT CONTROL DEVICE

[75] Inventor: Taizo Yasutake, Cupertino, Calif.

[73] Assignee: ITU Research, Inc., Cupertino, Calif.

[*] Notice: The term of this patent shall not extend beyond the expiration date of Pat. No. 5,335,557.

[21] Appl. No.: 509,797

[22] Filed: Aug. 1, 1995

Related U.S. Application Data

[63] Continuation of Ser. No. 238,257, May 3, 1994, abandoned, which is a continuation-in-part of Ser. No. 798,572, Nov. 26, 1991, Pat. No. 5,335,557.

[51] Int. Cl.⁶ .................. G09G 5/00; G06F 3/14
[52] U.S. Cl. ............ 345/173; 345/157; 345/167
[58] Field of Search .................. 345/156, 157, 345/167, 168, 173–177, 139; 73/862.041, 862.043, 862.05

[56] References Cited

U.S. PATENT DOCUMENTS

| | | | |
|---|---|---|---|
| 3,490,059 | 1/1970 | Paulsen et al. | 73/133 |
| 4,017,858 | 4/1977 | Kuipers | . |
| 4,216,467 | 8/1980 | Colston | 74/471 |
| 4,448,083 | 5/1984 | Hayashi | 73/862.04 |
| 4,550,221 | 10/1985 | Mabusth | 178/18 |
| 4,550,617 | 11/1985 | Fraignier et al. | 73/862.04 |
| 4,601,206 | 7/1986 | Watson | 73/514 |
| 4,704,909 | 11/1987 | Grahn et al. | 73/862.04 |
| 4,720,805 | 1/1988 | Vye | . |
| 4,787,051 | 11/1988 | Olson | . |
| 4,798,919 | 1/1989 | Miessler et al. | 178/18 |
| 4,811,608 | 3/1989 | Hilton | 73/862.04 |
| 4,823,634 | 4/1989 | Culver | 74/471 XY |
| 4,839,838 | 6/1989 | LaBiche et al. | 364/709.11 |
| 4,983,786 | 1/1991 | David R. et al. | 178/18 |
| 4,988,981 | 1/1991 | Zimmerman et al. | 340/709 |
| 5,095,303 | 3/1992 | Clark et al. | 345/156 |
| 5,128,671 | 7/1992 | Thomas, Jr. | 341/20 |
| 5,165,897 | 11/1992 | Johnson | 434/113 |
| 5,178,012 | 1/1993 | Culp et al. | 73/510 |
| 5,185,561 | 2/1993 | Good et al. | 318/432 |
| 5,262,777 | 11/1993 | Low et al. | 345/157 |
| 5,335,557 | 8/1994 | Yasutake | 73/862.043 |
| 5,354,162 | 10/1994 | Burdea et al. | 414/5 |
| 5,389,865 | 2/1995 | Jacobus et al. | 318/568.11 |
| 5,408,407 | 4/1995 | Lefkowitz et al. | 364/167.01 |
| 5,429,140 | 7/1995 | Burdea et al. | 128/774 |
| 5,440,476 | 8/1995 | Lefkowitz et al. | 364/167.01 |
| 5,459,382 | 10/1995 | Jacobus et al. | 318/568.11 |
| 5,483,261 | 1/1996 | Yasutake | 345/173 |
| 5,543,590 | 8/1996 | Gillespie et al. | 178/18 |

FOREIGN PATENT DOCUMENTS

| | | |
|---|---|---|
| 2254911 | 10/1992 | United Kingdom . |
| WO9520787 | 8/1995 | WIPO . |
| WO9520788 | 8/1995 | WIPO . |

OTHER PUBLICATIONS

Kameyama, Ken-ichi et al., "A Shape Modeling System with a Volume Scanning Display and Multisensory Input Device," Presence, vol. 2, No. 2, Spring 1993, pp. 104–111.

Murakami, Tamotsu et al., "Direct and Intuitive Input Device for 3–D Shape Deformation," Human Factors in Computing Systems, Apr. 24–29, 1994, pp. 465–470.

Krueger, Myron W., "Artificial Reality," 1983, pp. 54–75.

Primary Examiner—Jeffery Brier
Attorney, Agent, or Firm—Hickman Beyer & Weaver

[57] ABSTRACT

A family of controllers incorporate multiple force/touch sensitive input elements to provide intuitive input in up to six degrees of freedom, including position and rotation, in either a Cartesian, cylindrical or spherical coordinate system. Six dimensions of input can be generated without requiring movement of the controller, which provides a controller suitable for controlling cursors and display objects in an interactive computer system and for equipment such as heavy cranes and fork lift trucks. Position information is obtained either by use of a "pushing" or "dragging" metaphor. Rotational information is provided by either a "pushing," "twisting," or "gesture" metaphor. In certain embodiments, the same sensor is used for both position and rotational inputs, and the two are differentiated by the magnitude of the force applied to the sensor.

28 Claims, 24 Drawing Sheets

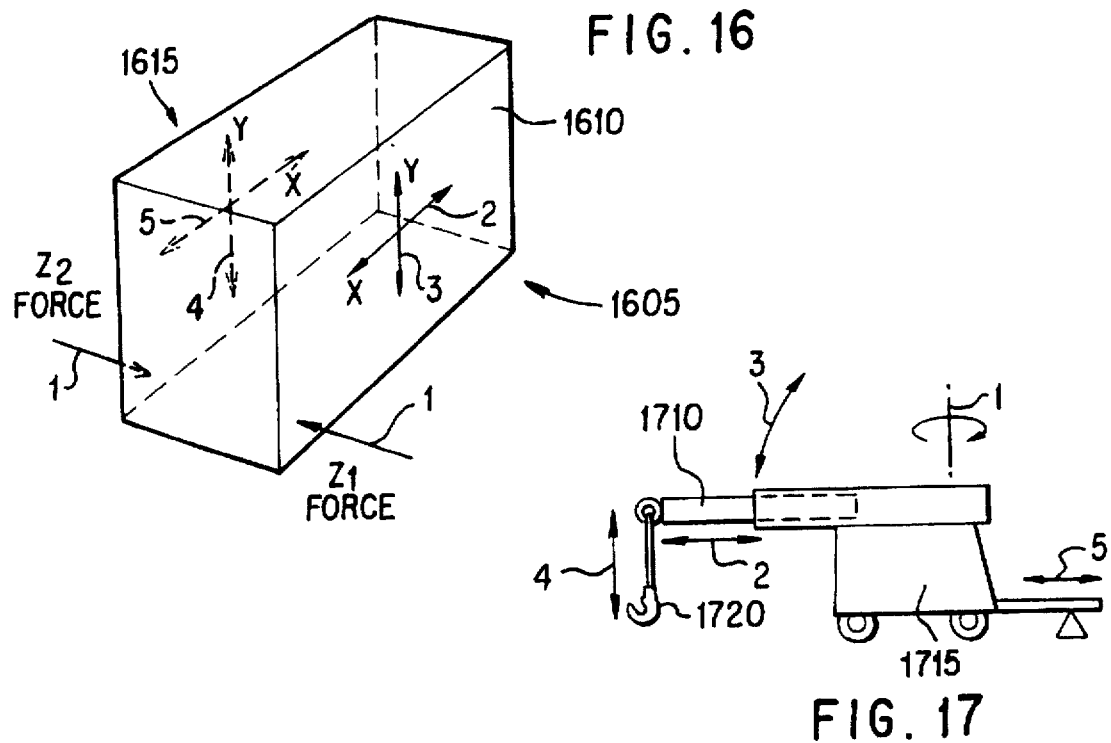
FIG. 16
FIG. 17
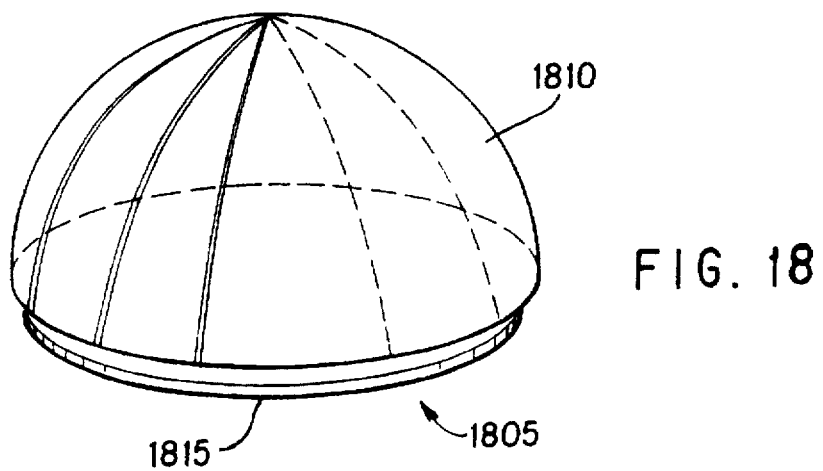
FIG. 18

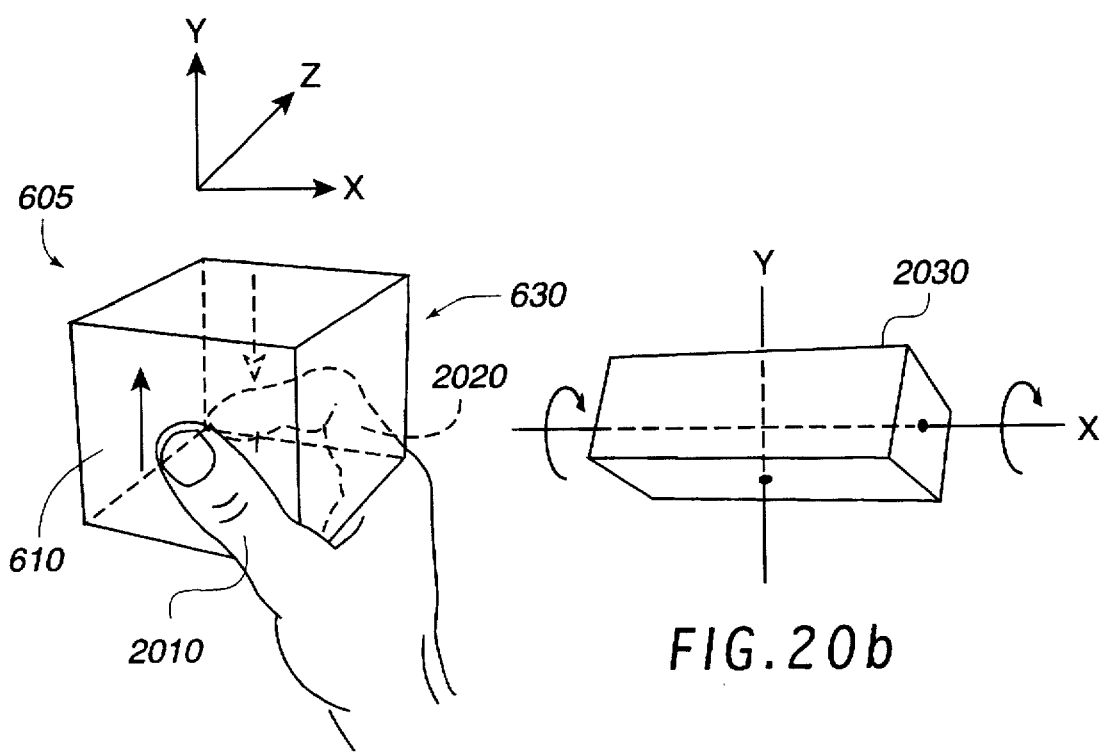
FIG.20a
FIG.20b
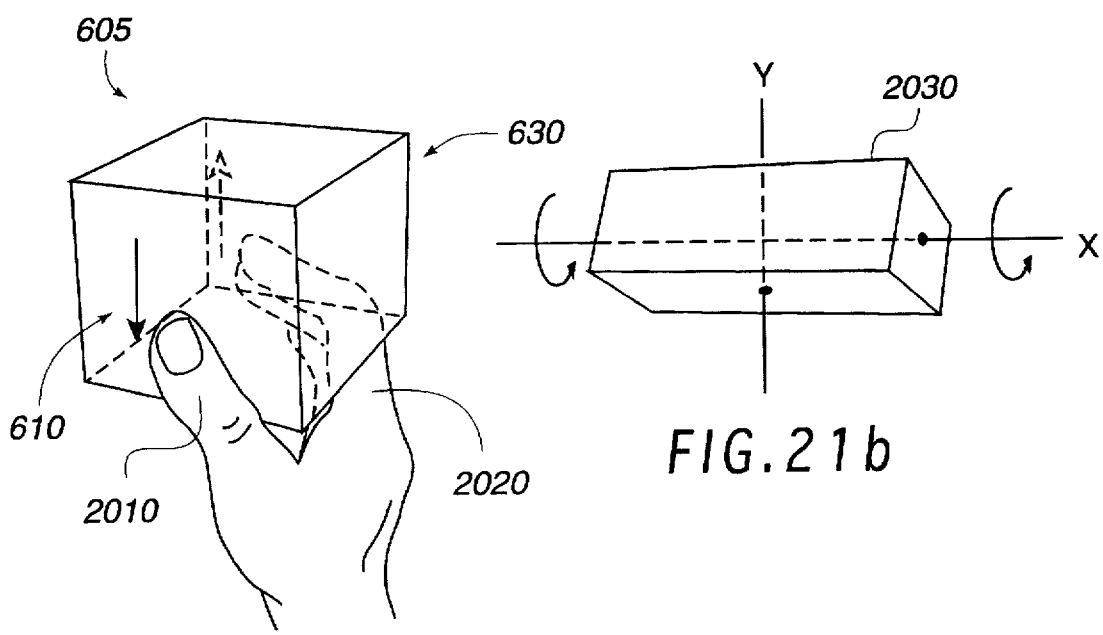
FIG.21a
FIG.21b

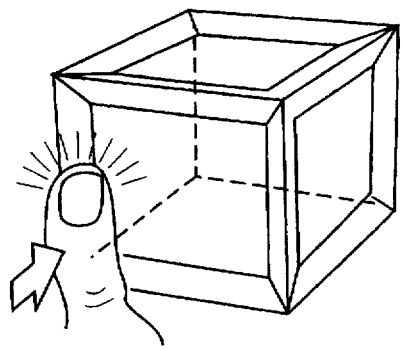
FIG.33a1
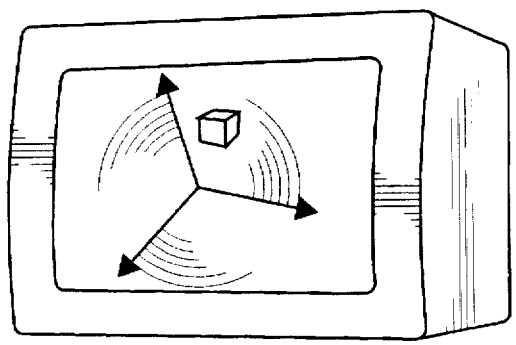
FIG.33a2
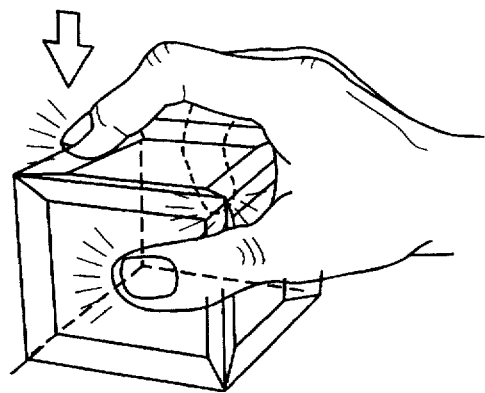
FIG.33b1
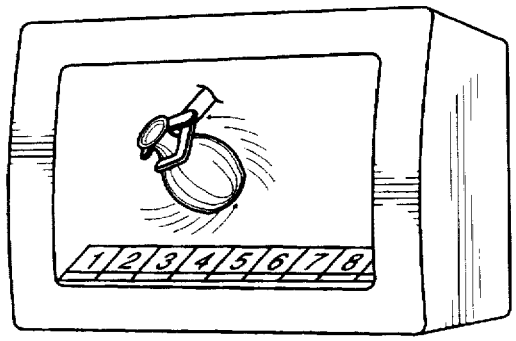
FIG.33b2
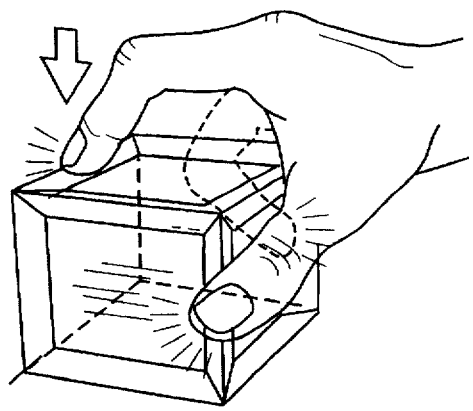
FIG.33c1
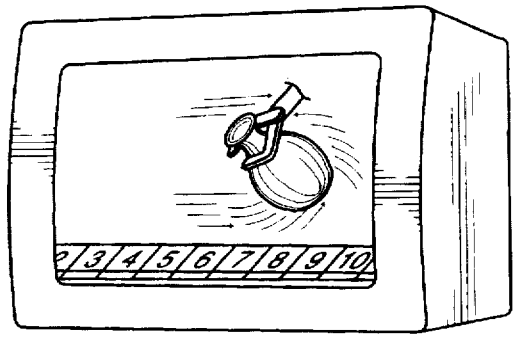
FIG.33c2

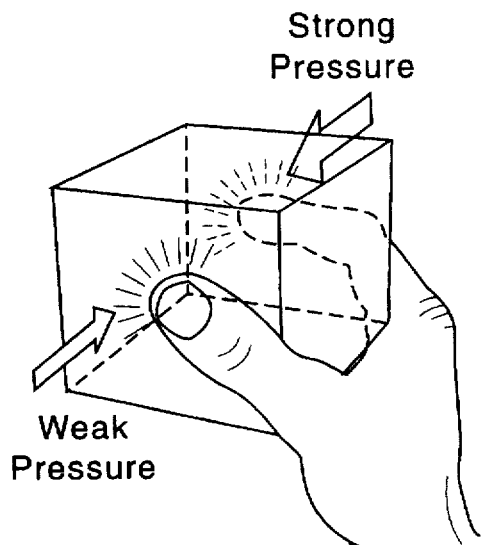
FIG.33d1
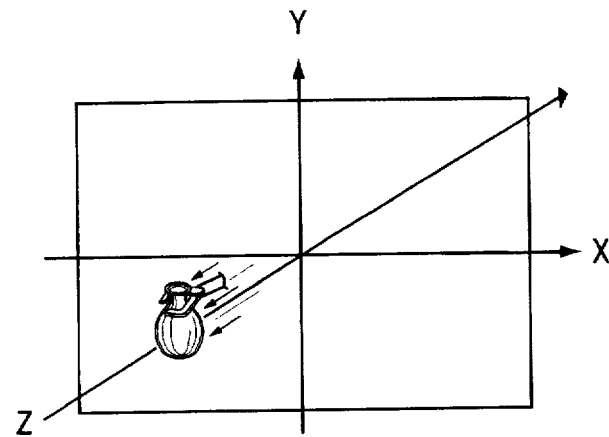
FIG.33d2
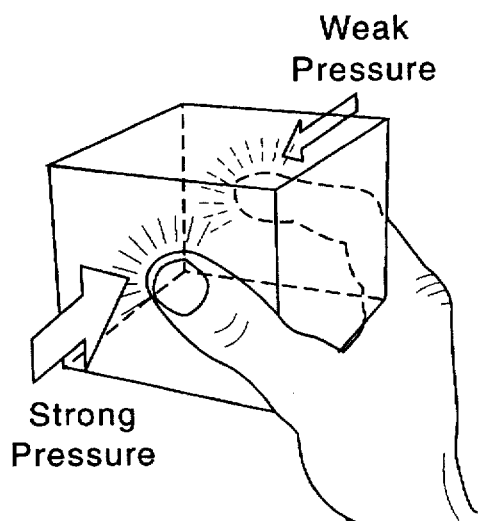
FIG.33d3
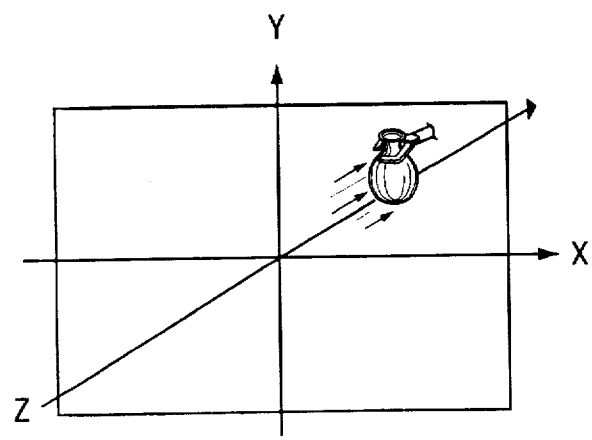
FIG.33d4

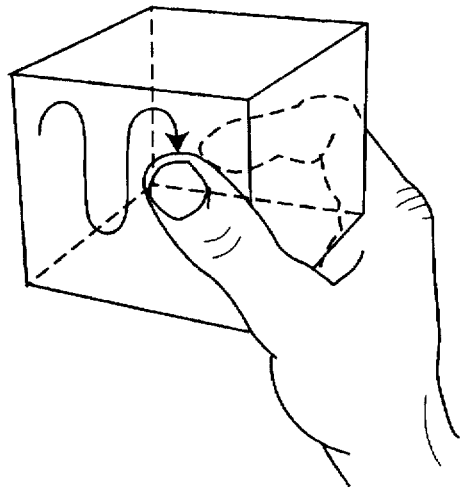
FIG.33d5
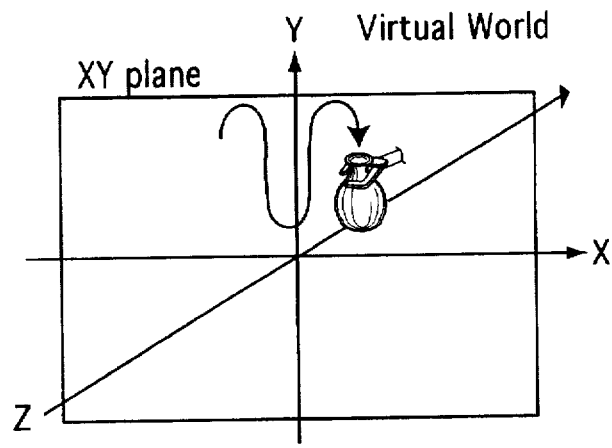
FIG.33d6
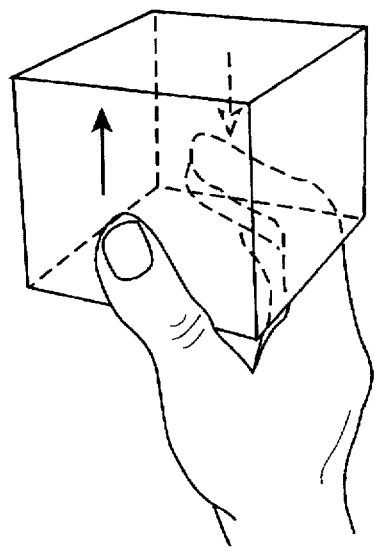
FIG.33e1
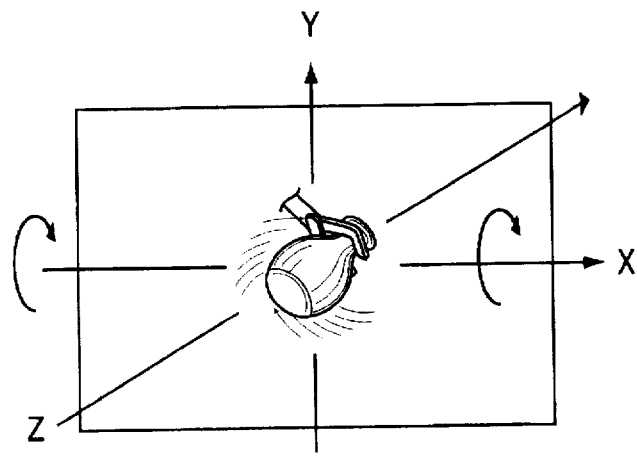
FIG.33e2

TOUCH SENSITIVE INPUT CONTROL DEVICE

REFERENCE TO ORIGINAL APPLICATION

This application is a continuation of patent application Ser. No. 08/238,257, filed May 3, 1994, now abandoned, which is a continuation-in-part of patent application Ser. No. 07/798,572, filed Nov. 26, 1991, now U.S. Pat. No. 5,335,557.

BACKGROUND OF THE INVENTION

1. Field

The present invention relates to the field of input control devices. More specifically, it relates to force-sensitive input-control devices with multiple surfaces capable of providing intuitive input in up to six degrees of freedom, including position and rotation relative to three axes. Six dimensions of input can be generated without requiring movement of the controller, which provides a controller suitable for controlling both cursors or display objects in an interactive computer system. Further, the controller is insensitive to acoustic or electromagnetic noise and is thus suitable for controlling equipment such as heavy cranes and fork lift trucks.

2. Art Background

2. (a) Prior Art 3D and 6D Input Control Devices

Two-dimensional input control devices such as mice, joysticks, trackballs, light pens and tablets are commonly used for interactive computer graphics. These devices are refined, accurate and easy to use. Three-dimensional ("3D") devices allow for the positioning of cursors or objects relative to conventional X, Y and Z coordinates. Six-dimensional ("6D") devices are also capable of orienting or rotating objects. More specifically, 6D devices may provide position information as in a 3D device and further provide rotational control about each of three axes, commonly referred to as roll, pitch and yaw. However, current 3D and 6D input devices do not exhibit the refinement, accuracy or ease of use characteristic of existing 2D input devices. In fact, existing 3D/6D input devices are typically cumbersome, inaccurate, non-intuitive, tiring to use, and limited in their ability to manipulate objects.

One well known category of 3D computer controllers are the "computer gloves," such as the Power Glove controller distributed by Mattel, Inc. Similar devices include the Exos Dextrous Hand Master by Exos, Inc., and the Data Glove by VPL Research, Inc. These controllers are worn as a glove and variously include sensors for determining the position and orientation of the glove and the bend of the various fingers. Position and orientation information is provided by ranging information between multiple electromagnetic or acoustic transducers on a base unit and corresponding sensors on the glove. However, the user is required to wear a bulky and awkward glove and movement of these awkward controllers in free space is tiring. Further, these devices are typically affected by electromagnetic or acoustic interference, and they are limited in their ability to manipulate objects because of the inherent A second category of 3D/6D controllers are referred to as "Flying Mice." The Bird controller by Ascension Technology Corp. of Burlington, Vt. tracks position and orientation in six-dimensions using pulsed (DC) magnetic fields. However, it is affected by the presence of metals and also requires manipulating the controller in free space. The 2D/6D Mouse of Logitech Inc. is similar in function, but uses acoustic ranging similar to the Mattel device. The 3SPACE sensor from Polhemus, described in U.S. Pat. No. 4,017,858, issued to Jack Kuipers Apr. 12, 1977, uses electromagnetic coupling between three transmitter antennas and three receiver antennas. Three transmitter antenna coils are orthogonally arranged as are three receiver antennas, and the nine transmitter/receiver combinations provide three dimensional position and orientation information. However, all "flying mouse" devices require the undesirable and tiring movement of the user's entire arm to manipulate the controller in free space. Further, these devices are either tethered by a cord or sensitive to either electromagnetic or acoustic noise.

A device similar to the flying mice is taught in U.S. Pat. No. 4,839,838. This device is a 6D controller using 6 independent accelerometers in an "inertial mouse." However, the device must still be moved in space, and the use of accelerometers rather than ranging devices limits the accuracy. Another inertial mouse system is taught in U.S. Pat. No. 4,787,051 issued to Lynn T. Olson.

A third category of 3D/6D controllers includes 3D/6D joysticks and trackballs. Spaceball of Spatial Systems, Inc. is a rigid sphere containing strain gauges or optical sensors to measure the forces and torques applied to a motionless ball. The user pushes, pulls or twists the ball to generate 3D translation and orientation control signals. Spaceball is described in detail in U.S. Pat. No. 4,811,608 issued to John A. Hilton Mar. 14, 1989. Similarly, the DIMENSION 6/Geoball controller distributed by CiS Graphics Inc. incorporates a 6-axis optical torque sensor housed in a spherical enclosure. The device measures translational forces and rotational torques. However, these devices are subject to a number of disadvantages. For example, it is difficult to provide for precise positioning, as there is no provision for the use of a stylus. Further, these devices are primarily controlled with hand muscles, rather than with the more precise finger muscles. Further still, these devices provide for only relative control and have no provision for providing an absolute origins or an absolute positions. They are therefor not suitable for providing closure in digitized 3D inputs. Finally, they are limited in there ability to provide an intuitive feel for 3D manipulation of a controlled object not specified in the Cartesian coordinate system. For example, they are not readily adaptable to spherical or cylindrical coordinate systems.

2. (b) Prior Art Force-Sensitive Transducers

Force-sensitive transducers are characterized in that they do not require a significant amount of motion in order to provide a control input. These devices have appeared in a number of configurations, some of which are capable of sensing not only the presence or non-presence of the touch of a user's finger or stylus, but also the ability to quantitatively measure the amount of force applied. One such a device is available from Tekscan, Inc. of Boston, Mass. This device includes several force-sensitive pads in a grid-based matrix that can detect the force and position of multiple fingers at one time. Another force-sensitive device is available from Intelligent Computer Music Systems, Inc. of Albany, N.Y. under the TouchSurface trademark. The TouchSurface device can continuously follow the movement and pressure of a fingertip or stylus on its surface by responding to the position (X and Y) at which the surface is touched and to the force (Z) with which it is touched. Further, if two positions are touched simultaneously in the TouchSurface device, an average position of the two positions is provided. However, these devices are currently limited in manipulating objects beyond 2.5 dimensions, i.e. X-position, Y-position, and positive Z-direction, and are not available in any intuitive controllers.

Force-sensitive transducers have been used in two-dimensional applications in place of spring-loaded joysticks. For example, U.S. Pat. No. 4,719,538 issued to John D. Cox teaches using force-responsive capacitive-transducers in a joystick-type device. However, these devices do not typically provide for 3D/6D inputs. An augmented 2D controller using force-sensitive devices is taught in U.S. Pat. No. 4,896,543 issued to Larry S. Gullman. Gullman describes a three-axis force measurement stylus used as a computer input device wherein the forces sensed by the stylus are used for recognizing ciphers, selecting colors, or establishing line widths and line densities. However, this device does not provide inputs for roll, yaw or pitch, and does not provide any input for a negative Z input (i.e. there is no input once the stylus is lifted). Thus, it is limited in its ability to provide 3D positioning information, as this would require an undesirable bias of some sort.

2. (c) Prior Art 3D/6D Field Controllers

3D/6D controllers are found in many field applications, such as controllers for heavy equipment. These devices must be rugged, accurate and immune from the affects of noise. Accordingly, many input control devices used for interactive computer graphics are not suitable for use in field applications. As a result, heavy equipment controllers typically consist of a baffling array of heavy-but-reliable levers which have little if any intuitive relationship to the function being performed. For example, a typical heavy crane includes separate lever controls for boom rotation (swing), boom telescope (extension), boom lift and hook hoist. This poor user interface requires the operator to select and select and pull one of a number of levers corresponding to the boom rotation control to cause the boom to rotate to the left. Such non-intuitive controls makes training difficult and accidents more likely.

Accordingly, it is desirable to provide a 3D/6D controller that is easy to use, inexpensive, accurate, intuitive, not sensitive to electromagnetic or acoustic interference, and flexible in its ability to manipulate objects. Specifically, a substantial need exists for a graphical input device capable of providing for the precision manipulation of position and spatial orientation of an object, and that also provides for precise positioning and orientation by the use of a stylus or pen. It is desirable that the device accepts intuitive and simple input actions such as finger motion to manipulate position and orientation. It is desirable that it does not require manipulation of a controller in free space or otherwise cause fatigue. It is desirable that the device provides the dual-functionality of both absolute and relative inputs, that is, inputs similar to a data tablet or touch panel that provide for absolute origins and positions, and inputs similar to mice and trackballs that report changes from former positions and orientations. It is desirable that the device recognizes multiple points for positioning and spatial orientation and allows the use of multiple finger touch to point or move a controlled object in a precise manner. Further, it is desirable to have a controller which exhibits a zero neutral force, that is, one that does not require a force on the controller to maintain a neutral position.

SUMMARY OF THE INVENTION

A family of controllers incorporate multiple force/touch sensitive input elements and provide intuitive input in up to six degrees-of-freedom, including position and rotation, in either a Cartesian, cylindrical or spherical coordinate system. Six dimensions of input can be generated without requiring movement of the controller, which provides a controller suitable for controlling both cursors or display objects in an interactive computer system and for controlling equipment such as heavy cranes and fork lift trucks. In various embodiments position information is obtained by either a "pushing" or "dragging" metaphor. Rotational information is provided by either a "pushing," "twisting," or "gesture" metaphor. In certain embodiments, the same sensor is used for both position and rotational inputs, and the two are differentiated by the magnitude of the force applied to the sensor.

These and other advantages and features of the invention will become readily apparent to those skilled in the art after reading the following detailed description of the preferred embodiment of the present invention and studying the accompanying drawings.

BRIEF DESCRIPTION OF THE DRAWINGS

FIG. 9b is an illustration of sensing yaw with reference to the controller of FIG. 9a.

FIG. 9c is an illustration of sensing roll with reference to the controller of FIG. 9a.

FIG. 9d is an illustration of sensing pitch with reference to the controller of FIG. 9a.

FIG. 16 illustrates a wedge controller adapted for use in controlling a mobile crane.

FIG. 17 illustrates a mobile crane.

FIG. 18 illustrates a controller for use in a spherical coordinate system.

FIGS. 20a and 20b illustrate an alternative technique for generating rotation commands using the controller of FIG. 6.

FIGS. 21a, 21b, 22, 23 and 24 illustrate techniques for generating rotation using the controller of FIG. 6.

FIGS. 33a1, 33a2, 33b1, 33b2, 33c1, 33c2, 33d1, 33d2, 33e1, and 33e2 illustrate the interpretation of various gestures.

DETAILED DESCRIPTION OF THE PREFERRED EMBODIMENT

Figure 1:
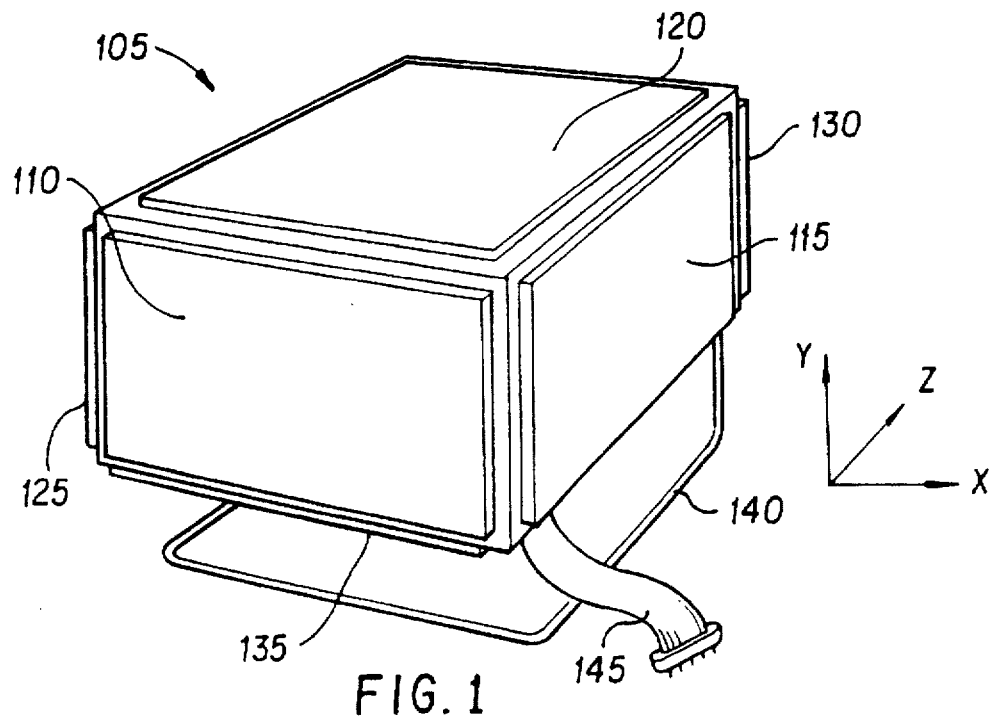
FIG. 1 is an illustration of a 3D controller having six force/touch sensitive sensors.

FIG. 1 is an illustration of a force/touch sensitive 3D controller in accordance with the first preferred embodiment of the present invention. A controller 105 is shaped in the form of a cube. A first force-sensitive pad 110 is positioned on the front of controller 105. A second force-sensitive pad 115 is positioned on the right side of controller 105. A third force-sensitive pad 120 is positioned on the top side of controller 105. A fourth force-sensitive pad 125 is positioned on the left side of controller 105. A fifth force-sensitive pad 130 is positioned on the back side of controller 105. A sixth force-sensitive pad 135 is positioned on the bottom side of controller 105. A frame 140 is attached to the edge of controller 105 between the bottom and back surfaces, allowing access to all six surfaces of controller 105. Control harness 145 is coupled to the six force-sensitive pads 110, 115, 120, 125, 130, and 135 and provides signals in response to the application of pressure to the pads.

Controller 105 is operated by pressing on any of the six force-sensitive pads. The user interface is intuitive since the real or displayed object will move as if it is responding to the pressure on controller 105. For example, pressing down on force-sensitive pad 120, positioned on the top of controller 105, will cause the object to move downward (−Y). Similarly, pressing up on force-sensitive pad 135, positioned on the bottom of controller 105, will cause the object to move upward (+Y). Pressing the controller towards the user, by pressing on force-sensitive pad 130, positioned on the back of controller 105, will cause the object to move towards the user (−Z). Pressing the controller away from the user, by pressing on force-sensitive pad 110, positioned on the front of controller 105, will cause the object to move away the operator (+Z). Pressing the controller to the left, by pressing on force-sensitive pad 115, positioned on the right side of controller 105, will cause the object to move to the left (−X). Similarly, pressing the controller to the right, by pressing on force-sensitive pad 125, positioned on the left side of controller 105, will cause the object to move to the right (+X).

Figure 2:
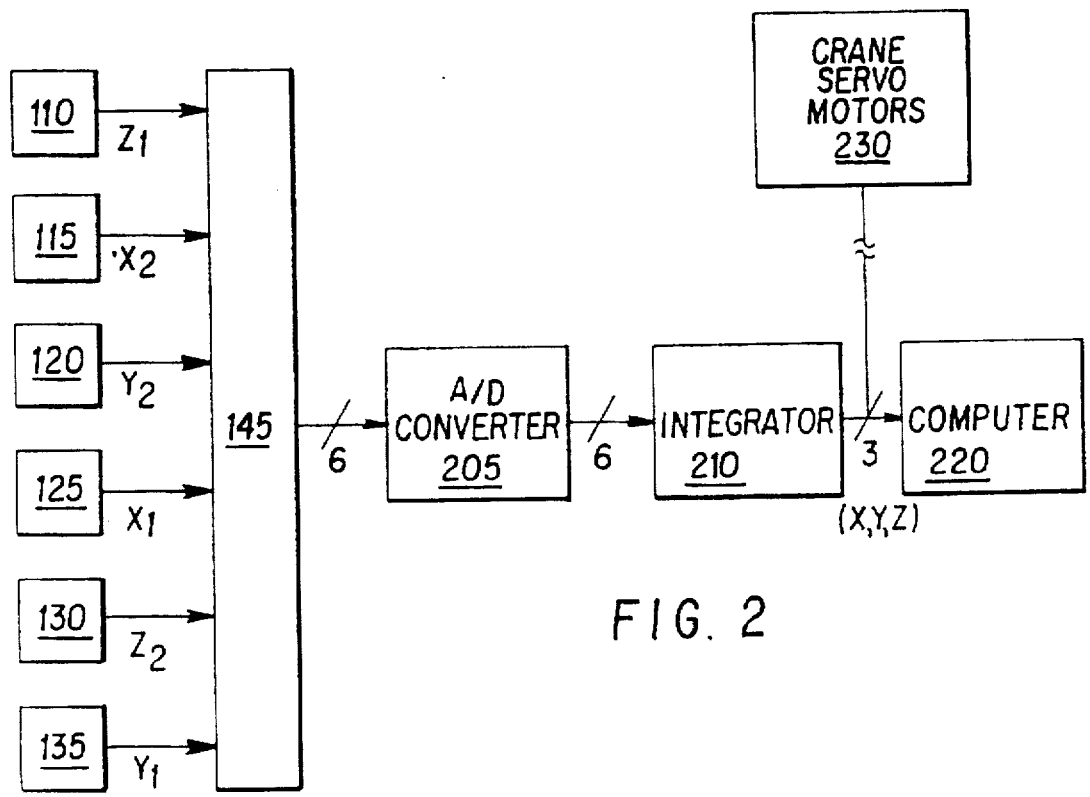
FIG. 2 is a block diagram of the control electronics of the 3D controller of FIG. 1.

A block diagram of the controller electronics used to provide 3D position information in conjunction with the controller of FIG. 1 is illustrated in FIG. 2. Force sensitive pads 110, 115, 120, 125, 130, and 135 are coupled to control harness 145, which couples all six force-sensitive pads to A/D converter 205. A/D converter 205 converts the analog signals from each of the force-sensitive pads into digital signals. The six digitized signals are coupled to integrator 210.

Integrator 210 integrates the difference of the signals from the left and right force-sensitive pads 125 and 115 to provide an X position signal $(X=\int(X_{125}-X_{115})dt)$; integrates the difference of the signals from the top and bottom force-sensitive pads 120 and 135 to provide a Y position signal $(Y=\int(Y_{135}-Y_{120})dt)$; and integrates the difference of the signals from the front and back force-sensitive pads 110 and 130 to provide a Z position signal $(Z=\int(Z_{110}-Z_{130})dt)$. The three position signals X, Y and Z are then coupled to a computer 220 to control the position of a cursor or display object, or alternatively to servo controls for heavy equipment, such as crane servo motors 230.

In the preferred first embodiment controller 105 is sensitive to the presence of a touch input and A/D converter 205 provides a binary signal output to integrator 210 for each force-sensitive pad. This provides a controller that provides a single "speed," that is, activation of a force-sensitive pad will result in the cursor, object or equipment moving in the desired direction at a certain speed. Alternatively, force-sensitive pads 110, 115, 120, 125, 130 and 135 can be of the type that provide analog outputs responsive to the magnitude of the applied force, A/D converter 205 can be of the type that provides a multi-bit digital signal, and integrator 210 can be of the type that integrates multi-bit values. The use of a multi-bit signals allows for multiple "speeds," that is, the speed of the cursor or object movement in a given direction will be responsive to the magnitude of the force applied to the corresponding force-sensitive pads.

Figure 3:
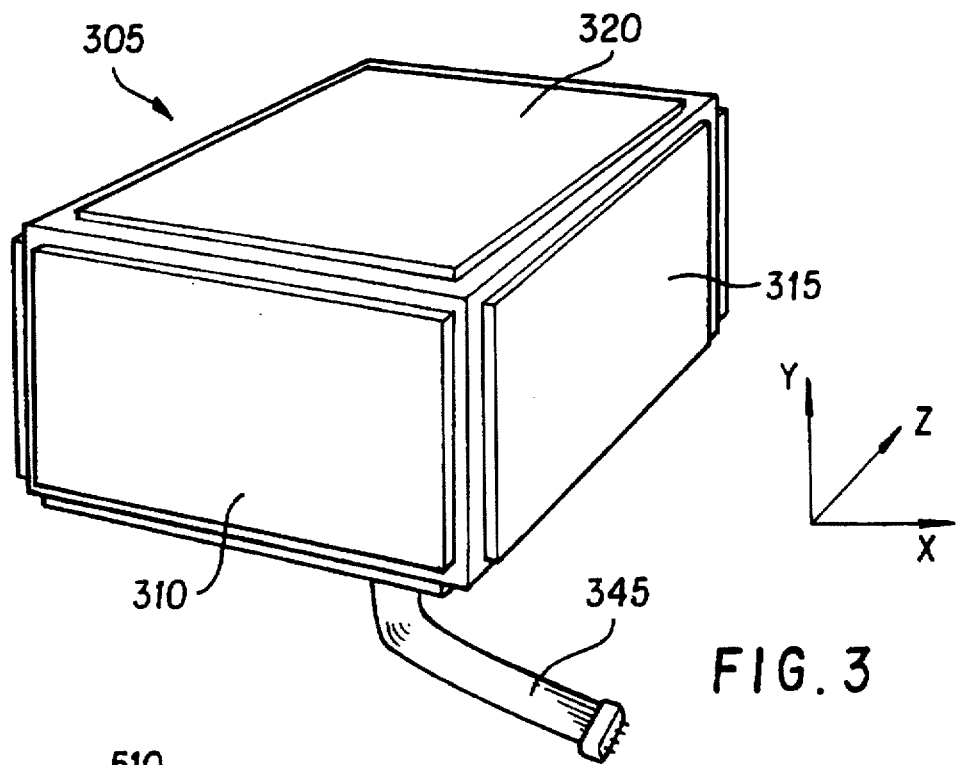
FIG. 3 is an illustration of a 6D controller having three X-Y-position and force/touch sensitive sensors.
Figure 4A:
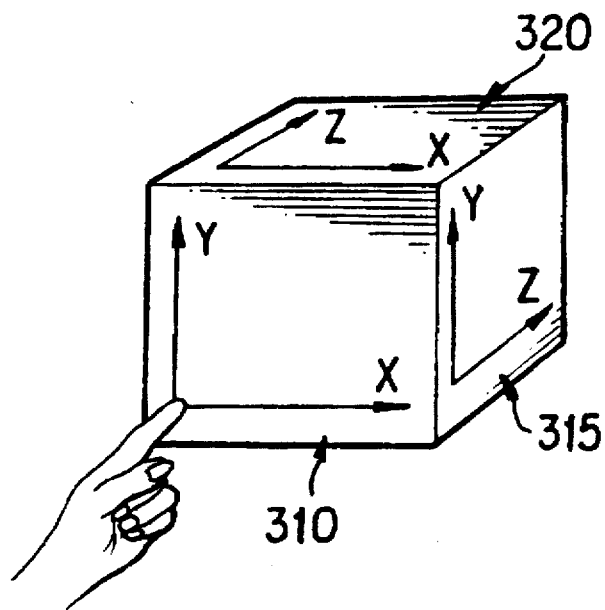
FIG. 4a illustrates the user interface of the controller of FIG. 3 with regards to position information.

FIG. 3 is an illustration of a force/touch sensitive 6D controller in accordance with the second preferred embodiment of the present invention. Controller 305 is also shaped in the form of a cube, however this controller uses three force-sensitive matrix sensors. A first force-sensitive matrix sensor 310 is positioned on the front of controller 305. Sensor 310 provides two analog signals in response to the position of an applied force, which provides X and Y position information as illustrated in FIG. 4a. Sensor 310 also provides a third signal in response to the magnitude of the force applied to sensor 310. A second force-sensitive matrix sensor 315 is positioned on the right side of controller 305. Sensor 315 provides two analog signals in response to the position of the force applied to sensor 315, which will be interpreted by control electronics to provide Y and Z information as illustrated in FIG. 4a. Sensor 315 also provides a third signal responsive to the magnitude of the force applied to sensor 315. A third force-sensitive matrix sensor 320 is positioned on the top side of controller 305. Sensor 320 provides two analog signals in response to the position of the force applied to sensor 320, which will be interpreted by the control electronics to provide Z and X information as illustrated in FIG. 4a.

In operation, sensors 310, 315 and 320 provide redundant X, Y and Z position control of a cursor, object or equipment.

That is, Y-position information can be entered on either sensor 310 or 315, X-position information can be entered on either sensor 310 or 320, and Z-position information can be entered on either sensor 315 or 320. The two X inputs are summed to provide the final X position information. Y and Z information is obtained in the same manner. Thus a change in position on a sensor is interpreted as a change of position of the real or display object, with a fixed or programmable gain.

Figure 4B:
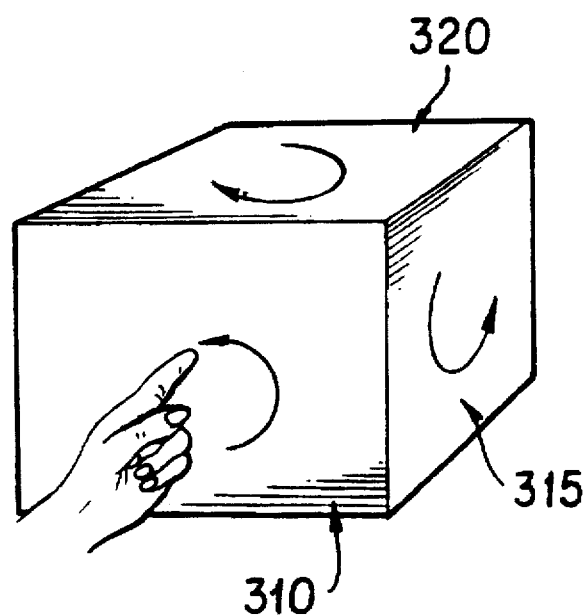
FIG. 4b illustrates the user interface of the controller of FIG. 3 with regards to rotational information.

For applications requiring six degrees-of-freedom input, such as manipulating the orientation of an object or equipment, sensors 310, 315 and 320 also provide the pitch, yaw and roll control. Specifically, the third signal provided by each sensor is used to differentiate "light" from "strong" pressures on each sensors. Threshold detector 535, illustrated in FIG. 5, receives the third signal from each sensor and couples the related two analog signals to either position interpreter 540 or to orientation interpreter 545 in response to the third signal being "light" or "strong" respectively. Specifically, when a pressure exceeding a pre-defined threshold is detected, the two analog signals from the affected sensor are used to provide orientation information. Referring to FIG. 4b, when a strong pressure is detected on sensor 310, the two analog signals from sensor 310 are used to provide pitch information about the Z-axis. Similarly, when a strong pressure is detected on sensor 315, the two analog signals from sensor 315 are used to provide roll information about the X-axis. Finally, when a strong pressure is detected on sensor 320, the two analog signals from sensor 320 are used to provide pitch information about the Y-axis.

Figure 5:
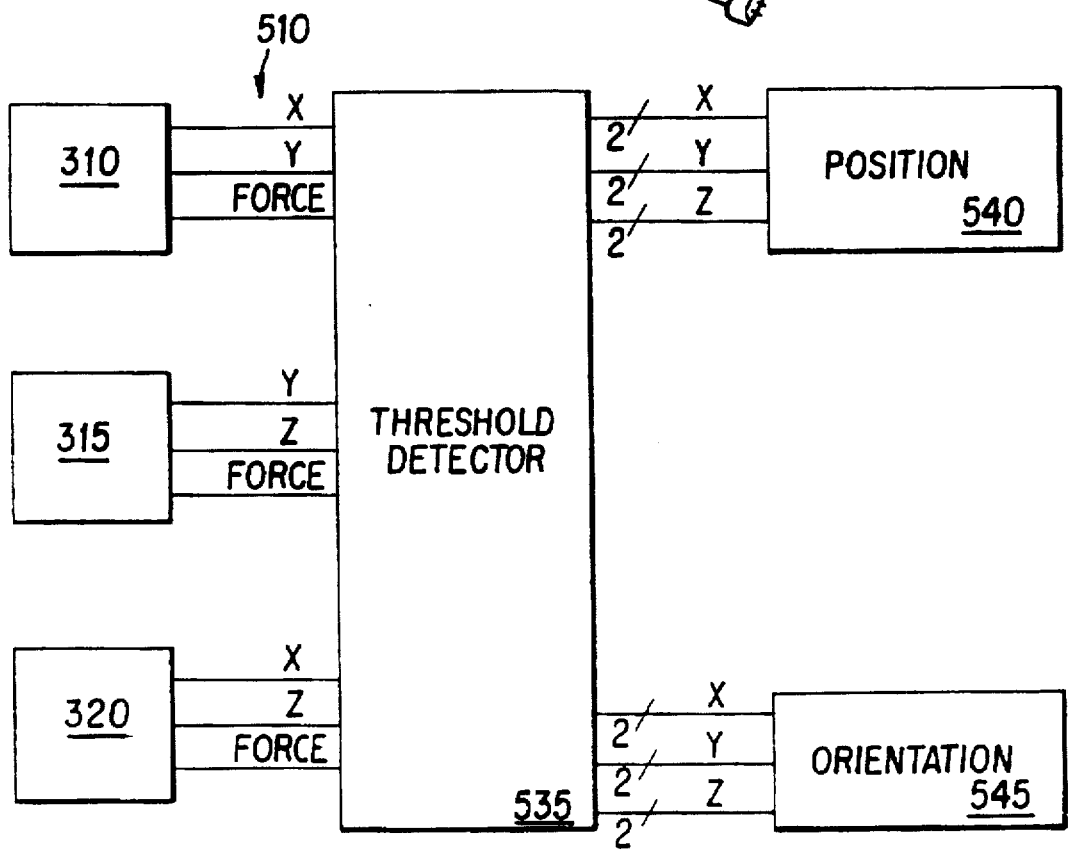
FIG. 5 is a block diagram of the control electronics of the 6D controller of FIG. 3.

FIG. 5 is a block diagram of the control electronics of the 6D controller of FIG. 3. Force-sensitive matrix sensors 310, 315, and 320 are coupled to control harness 510, which couples all three force-sensitive matrix sensors to threshold detector 535. A threshold detector 535 directs sensor information to either position interpreter 540 or orientation interpreter 545 in response to the magnitude of the force signal. Position interpreter 540 can operate in either of two modes. In an absolute mode, the position of the X-signal is directly translated to the X-position of the cursor or object. If two inputs are present the inputs can be either averaged or the second ignored. In a relative mode, position interpreter 540 responds only to changes in X-values. Again, if two inputs are present they can either be averaged or the second input ignored. The Y and Z information is obtained in a similar manner.

Orientation interpreter 545 interprets rotational gestures as rotational control signals. More specifically, when a user applies pressure above the threshold pressure as detected by threshold detector 535, the analog information from the affected sensor is coupled to orientation interpreter 545 and interpreted as an orientation or rotation about the axis perpendicular to that sensor. The angular position of the pressure point is calculated with reference to the center point of the sensor. In a relative operating mode any angular changes are interpreted as rotations. The rotation can be modified by a programmable gain if desired. Orientation interpreter can also operate in an absolute mode. In an absolute mode, the orientation is determined from the two signals from each sensor by determining the angular position of the input relative to the center point of the sensor.

Figure 6:
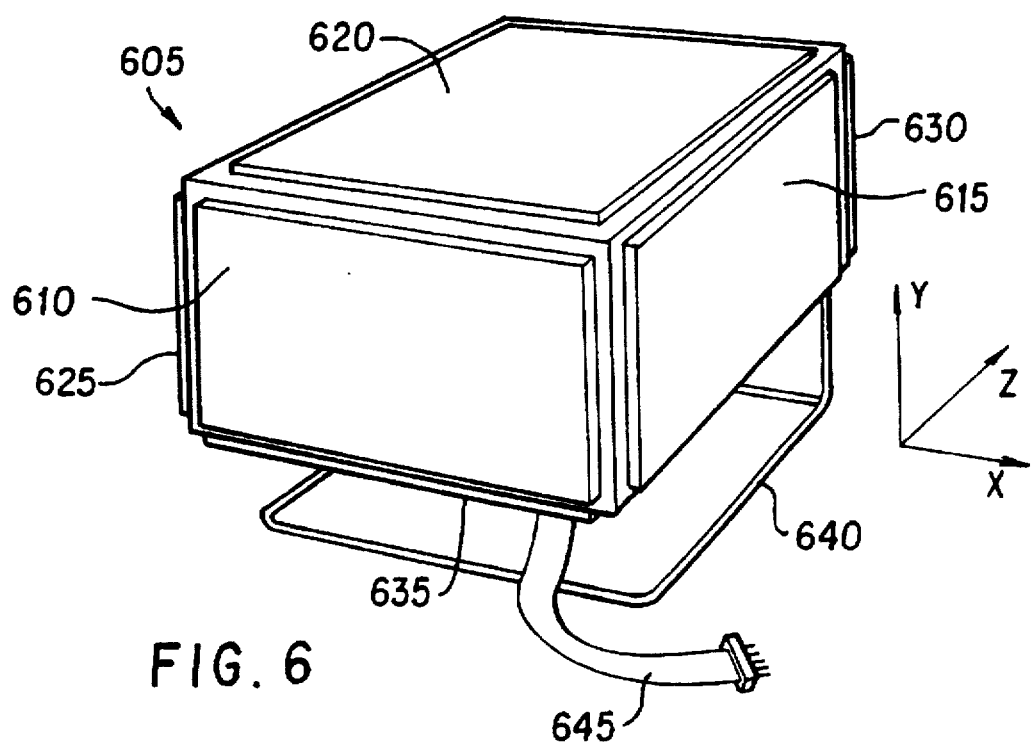
FIG. 6 illustrates a 6D controller having six X-Y-position and force/touch sensitive sensors.

FIG. 6 illustrates a third preferred embodiment of a 6D controller 605. Controller 605 is shaped in the form of a cube. A first force-sensitive matrix sensor 610 is positioned on the front of controller 605. A second force-sensitive matrix sensor 615 is positioned on the right side of controller 605. A third force-sensitive matrix sensor 620 is positioned on the top side of controller 605. A fourth force-sensitive matrix sensor 625 is positioned on the left side of controller 605. A fifth force-sensitive matrix sensor 630 is positioned on the back side of controller 605. A sixth force-sensitive matrix sensor 635 is positioned on the bottom side of controller 605. A frame 640 is attached to the edge of controller 605 between the bottom and back surfaces, allowing access to all six surfaces of controller 605. Control harness 645 is coupled to force-sensitive matrix sensor 610, 615, 620, 625, 630, and 635 and provides signals indicative of the magnitude and the position of the force applied to each sensor.

The X, Y and Z position data and the orientation data is derived in the same way as described with reference to controller 305 illustrated in FIGS. 3 and 4. The additional sensors provide multiple redundant entry capabilities. Specifically, yaw information about the Z-axis can be provided by either sensor 610 or sensor 630. Roll information about the X-axis can be provided by either sensor 615 or sensor 625. Pitch information about the Y-axis can be provided by either sensor 620 or sensor 635. Similarly, X-position information can be provided by sensors 610, 620, 630 and 635. Y-position data can be provided by sensors 610, 615, 630 and 625. Z-position data can be provided by sensors 620, 615, 635, 625. As before, multiple inputs can be resolved either by averages or by ignoring secondary inputs. More specifically, priority can be given to specific sensors or priority can be given with regards to the relative time of the inputs. Further, inputs can be interpreted on either absolute or relative modes.

Alternatively, rotation commands can be generated by another technique using the 6-sided controller of FIG. 6. Specifically, a rotation command is generated by simultaneously dragging a finger on one panel in a first direction, and dragging another finger on the opposite panel in the opposite direction. For example, as illustrated in FIG. 20a, the user's thumb 2010 is dragged vertically upward in a +Y direction on panel 610. Simultaneously, the user's forefinger 2020 is dragged vertically downward in a −Y direction on panel 630. This is interpreted as a positive rotation about the X-axis, as illustrated in FIG. 20b, where a displayed (or controlled) object 2030 is rotated about the X-axis as illustrated. More specifically, the position and change-of-position information is detected separately for each of the six panels. When touch points are detected simultaneously on opposite panels, the change-of-position information is compared for the opposite panels. If the change-of-position information indicates that the touch points are moving in substantially opposite directions, a rotation command is generated. Rotation nominally corresponds to the rotation about the affected axis such that a single complete rotation of the touch points about the controller 605 would result in a single revolution of the image. Alternatively, magnifications could be used such that the image would be rotated by an amount proportional to the rotation of the touch points.

Figure 22:
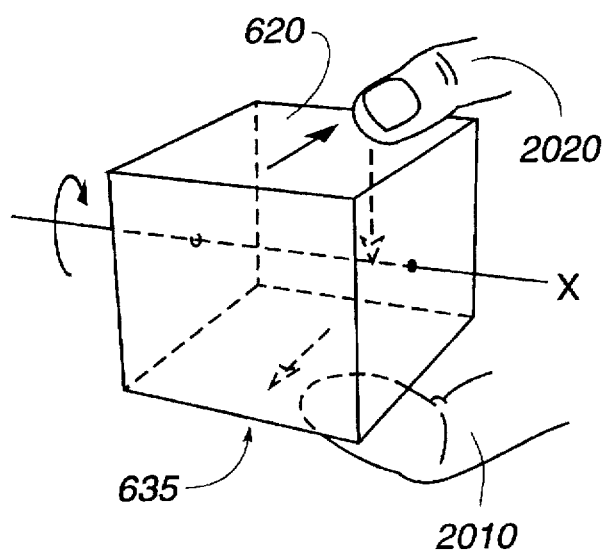
Figure 23:
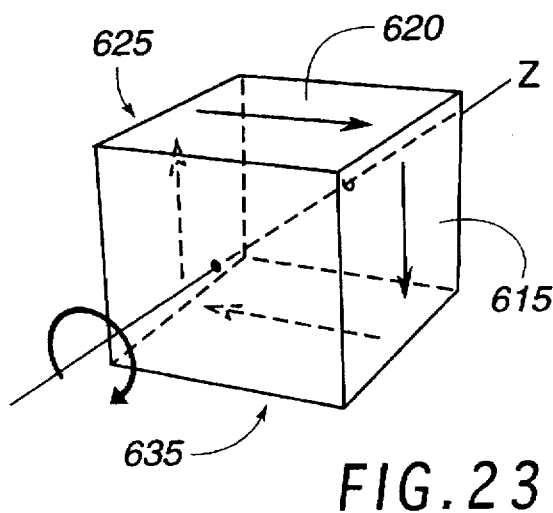
Figure 24:
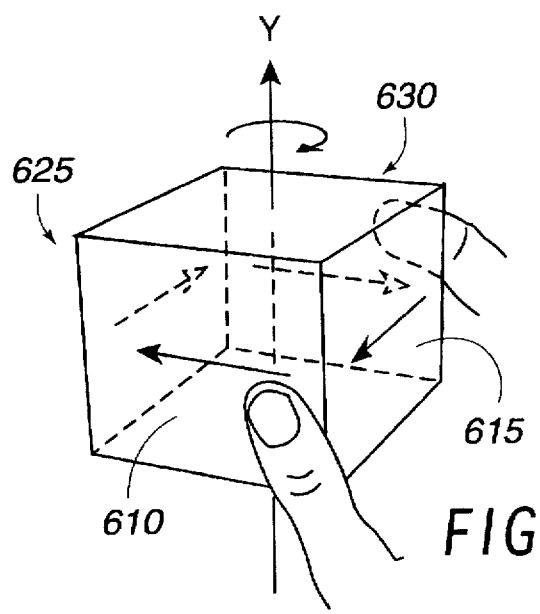

FIG. 21a illustrates the gesture corresponding to a negative rotation about the X-axis and FIG. 21b illustrates the corresponding movement of display (or controlled) object 2030. Similarly, rotation commands may be provided about the X-axis by gesturing on panels 620 and 635 parallel to the Z-axis, as illustrated in FIG. 22. Similarly again, rotation commands may be provided about the Z-axis by gesturing parallel to the X- and Y-axes on panels 615, 620, 625 and 635 as illustrated in FIG. 23, and about the Y-axis by gesturing parallel to the X- and Z-axes on panels 610, 625, 630 and 615 as illustrated in FIG. 24. The interpretation of the gestures is described more fully below in the section titled Gesture Interpretation.

Figure 7:
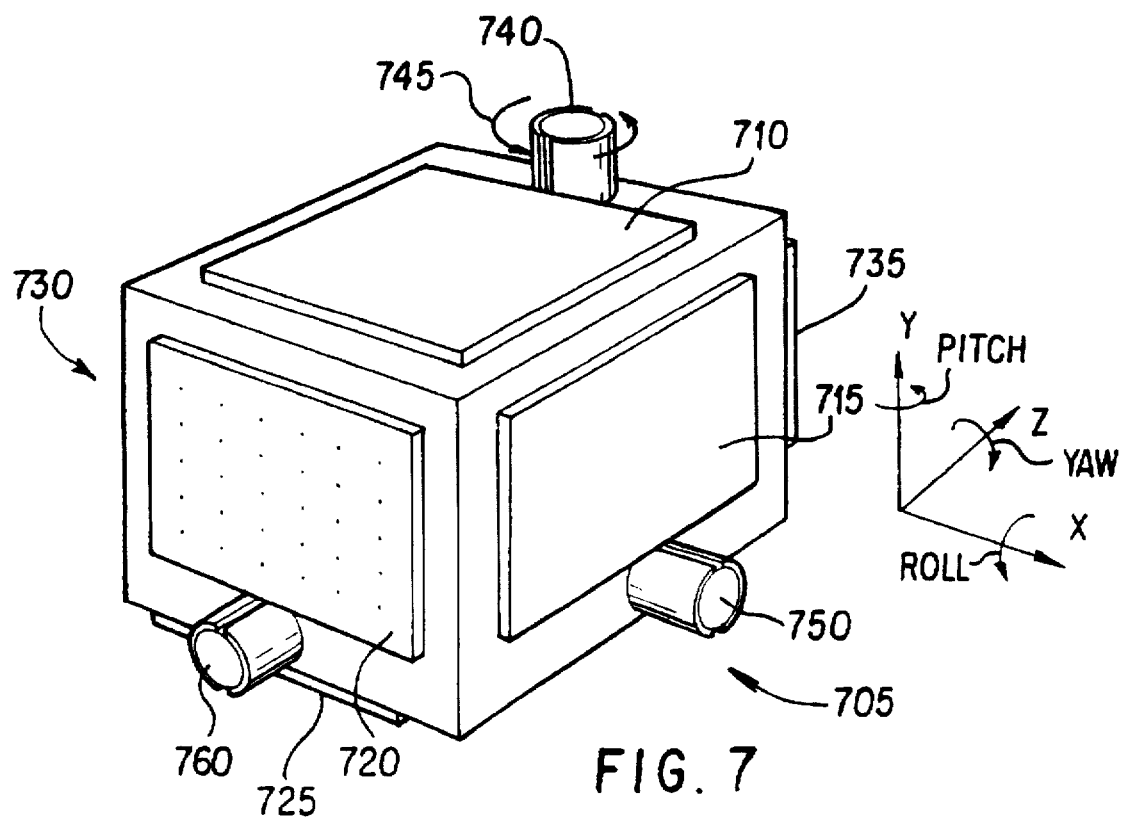
FIG. 7 illustrates a 6D controller having six X-Y-position and force/touch sensitive sensors and three knobs.

A fourth preferred embodiment of a 6D controller 705 is illustrated in FIG. 7. A controller 705 is shaped in the form of a cube with three attached knobs. Six force-sensitive matrix sensors 710, 715, 720, 725, 730 and 735 are positioned on controller 705 in the same manner as explained in detail with regards to controller 605 illustrated in FIG. 6. However, these force-sensitive matrix sensors are used only to generate position commands in the X, Y, and Z directions.

Knobs 740, 750 and 760 provide the orientation information for roll, yaw and pitch. Specifically, knob 740 provides pitch information about the Y-axis, knob 750 provides roll information about the X-axis, and knob 760 provides yaw information about the Z-axis.

As illustrated with regards to knob 740, each knob includes at least one sensor pad that can detect one dimensional information about the circumference of the knob. Preferably, each sensor can average two inputs. Movement of one or two pressure points on a sensor is interpreted as rotation about the axis of that sensor. Thus each knob generates orientation information about one axis in response to twisting of a thumb and finger about that knob. Specifically, sensor 745 on knob 740 provides one-dimensional position information about the circumference of knob 740. In the case of two inputs applied to a sensor, the average position of the two inputs is interpreted in a relative mode, and a programmable gain is provided. More specifically, the rotational command (the change in rotation) is calculated as follows:

$$theta = G * 360° * dl/L$$

Where theta is the rotational command;

G is the programmable gain;

dl is the change in the average position of the fingers; and

L is the circumference of the knob.

For example, twisting the thumb and finger one centimeter on knob 740 is interpreted as 90° of rotation about the Y-axis. Alternatively, the gain can be increased or decreased as desired.

Figure 8:
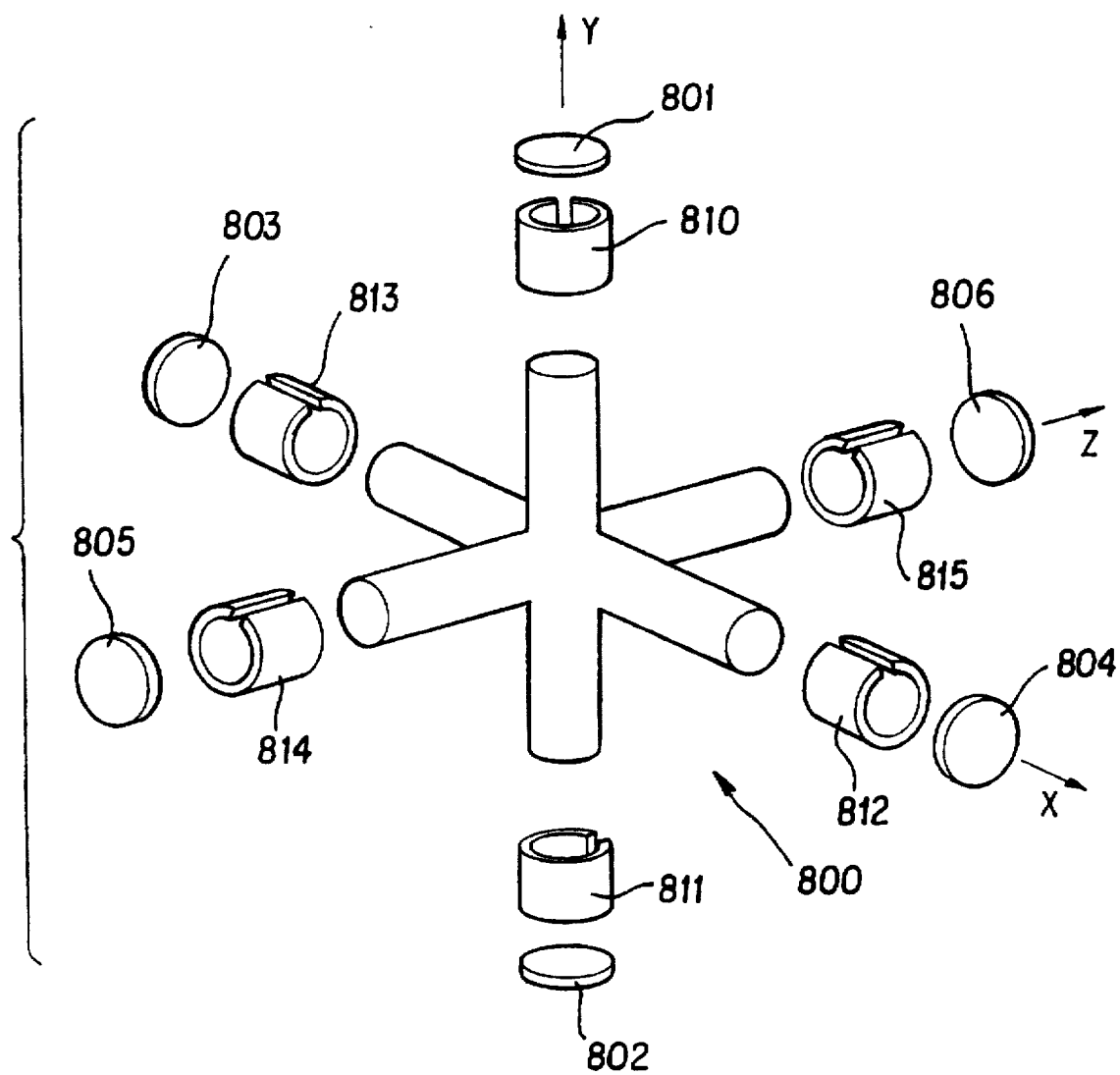
FIG. 8 is an expanded view of a "twist-mode" touch cylinder controller.

FIG. 8 is an expanded view of a touch cylinder 800 in accordance with another embodiment of the present invention. Touch cylinder 800 provides X, Y, and Z position information in response to forces applied to force-sensitive sensors 801, 802, 803, 804, 805, 806 positioned on the ends of six interconnected cylinders comprising touch cylinder 800. These six sensors are coupled and operate in the same manner as the six force-sensitive pad of controller 105 described with reference to FIG. 1. Touch cylinder 800 provides orientation information in response to signals from sensors 810, 811, 812, 813, 814 and 815. These sensors operate in the same manner as three knobs 740, 750 and 760 of controller 705 described with reference to FIG. 7, with the multiple inputs for each axis summed.

Another embodiment of a touch cylinder 900 is illustrated in FIG. 9. Again, touch cylinder 900 is constructed of six cylinders, each aligned along a Cartesian coordinate, and connected together at the origin of the Cartesian coordinate system. Each cylinder has force-sensitive sensors on its end for position information as in touch cylinder 800. However, touch cylinder 900 derives rotational information in a different manner. Specifically, the circumference of each cylinder is covered with a force-sensitive sensor that is divided into at least four sections. For example, the cylinder aligned in the +X direction includes sections 901, 902, 903, and 904.

Each section covers 90° along the circumference of the cylinder. Similarly, the other five cylinders are also covered by force-sensitive sensors each with four sections. As illustrated, the centers of each of the sections lie on a plane of the Cartesian coordinate system defined by the six cylinders.

Figure 9A:
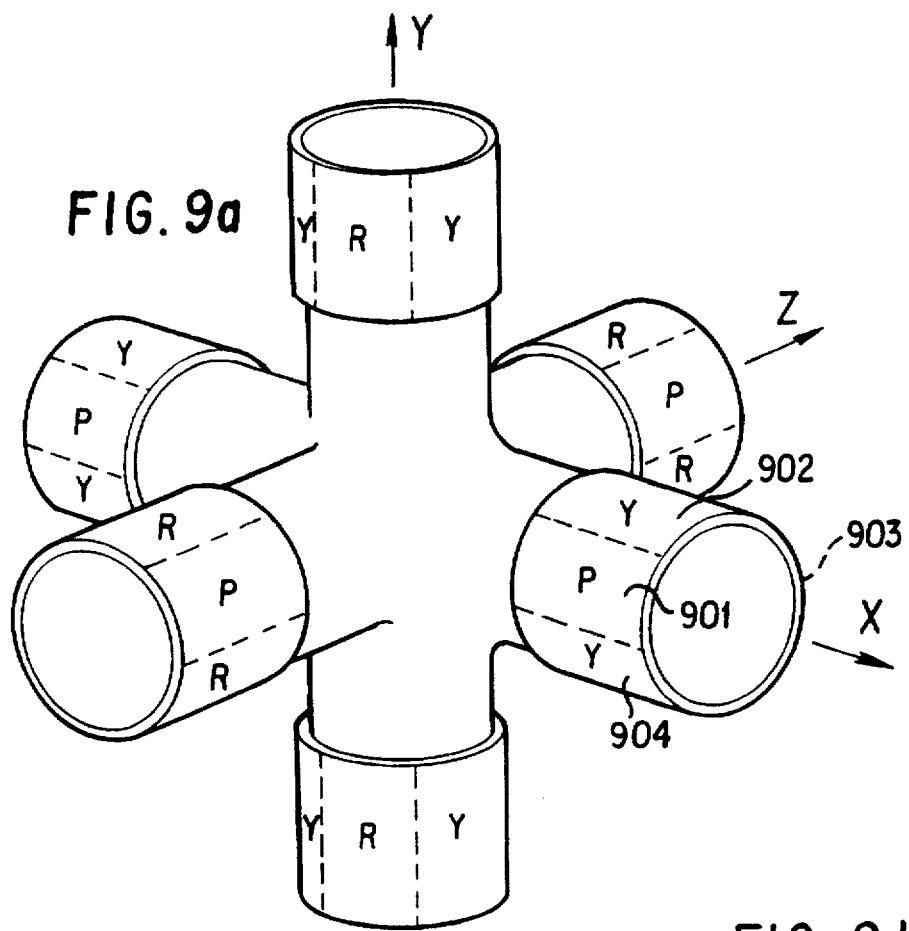
FIG. 9a is an illustration of a "push-mode" touch cylinder controller.
Figure 9B:
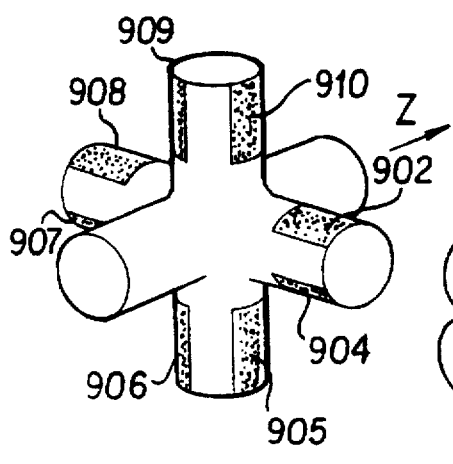
Figure 9C:
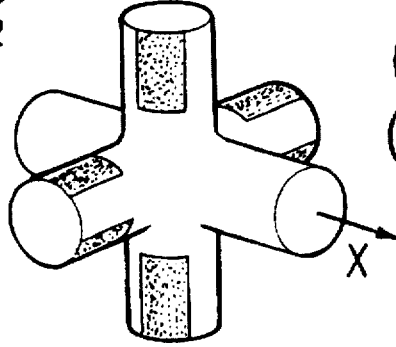
Figure 9D:
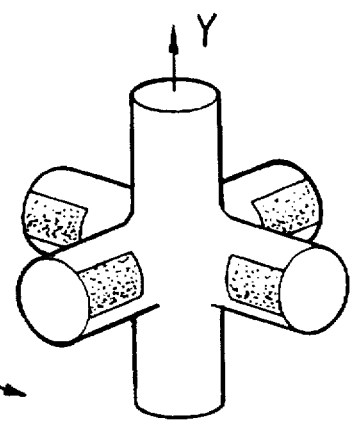

Operation of touch cylinder 900 is described with reference to a "push" mode. Specifically, rotational information is provided by "pushing" sensors positioned on the sides of the cylinders to rotate the object about one of the axes other than the one on the cylinder of the enabled sensor as if it had been "pushed" in the same direction as the controller. This is more easily explained by illustration. Referring to FIG. 9b, a rotational yaw input about the Z-axis is provided by pressing any of sensors 902, 904, 905, 906, 907, 908, 909 or 910. Sensors 904, 906, 908, and 910 provide a positive (counterclockwise) yaw signal, sensors 902, 905, 907 and 909 provide negative (clockwise) yaw signals. These signals can be combined as described above, and the signals can be either "on/off" or have multiple levels. Roll and pitch information is provided in a similar manner, as illustrated in simplified diagrams 9c and 9d.

Figure 10A:
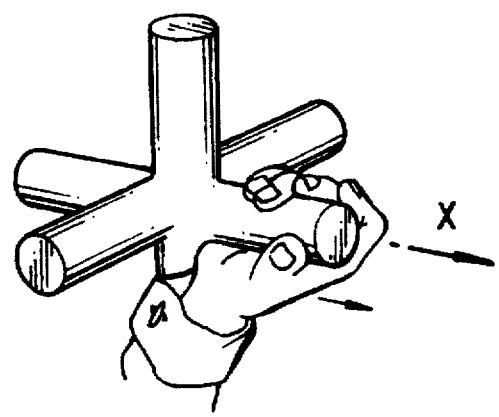
FIGS. 10a, 10b, and 10c are illustrations of sensing X-position, Y-position and Z-position respectively in a "drag-mode."
Figure 10B:
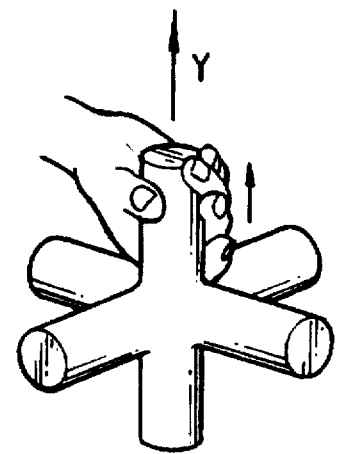
Figure 10C:
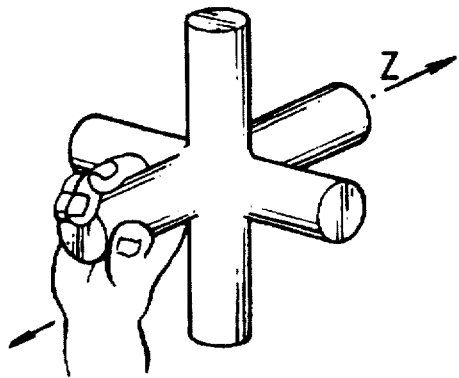

A third embodiment of a touch cylinder 1000 is illustrated in FIG. 10. Unlike touch cylinders 800 and 900, touch cylinder 1000 has no sensors on the ends of the six cylinders. Six sensors on the cylinders provide orientation information in the same manner as the sensors 810–815 in touch cylinder 800. However, the sensor pads of touch cylinder 1000 are two-dimensional and provide information responsive to the position of pressure along the cylinders as well as in response to the position of the pressure around the circumference of each cylinder. As illustrated in FIG. 10a, movement of the thumb and forefinger along the X-axis cylinder in the X-direction is detected by sensor 1010. The X-position information from the two inputs (thumb and forefinger) is averaged and used to provide a relative position input to the cursor or controlled object. Y-position information is provided in a similar manner as illustrated in FIG. 10b. Z-position information is provided as illustrated in FIG. 10c.

Figure 11:
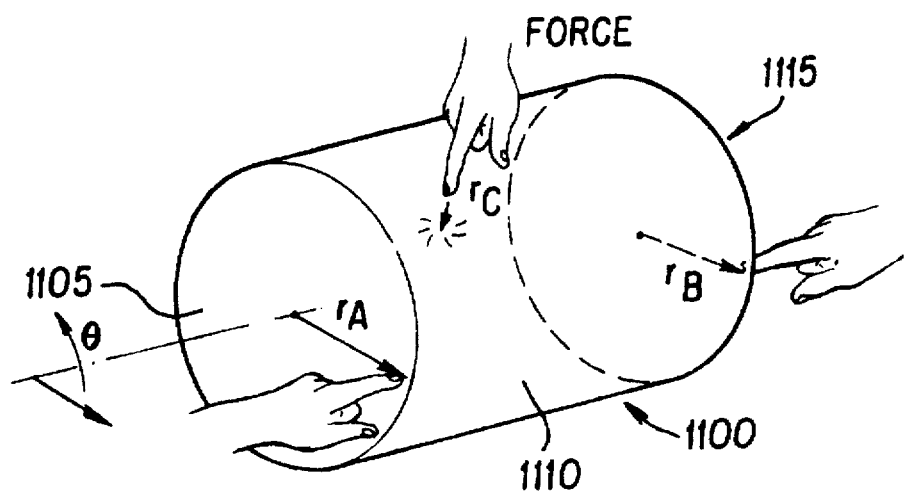
FIG. 11 illustrates a pipe-crawler controller.
Figure 12:
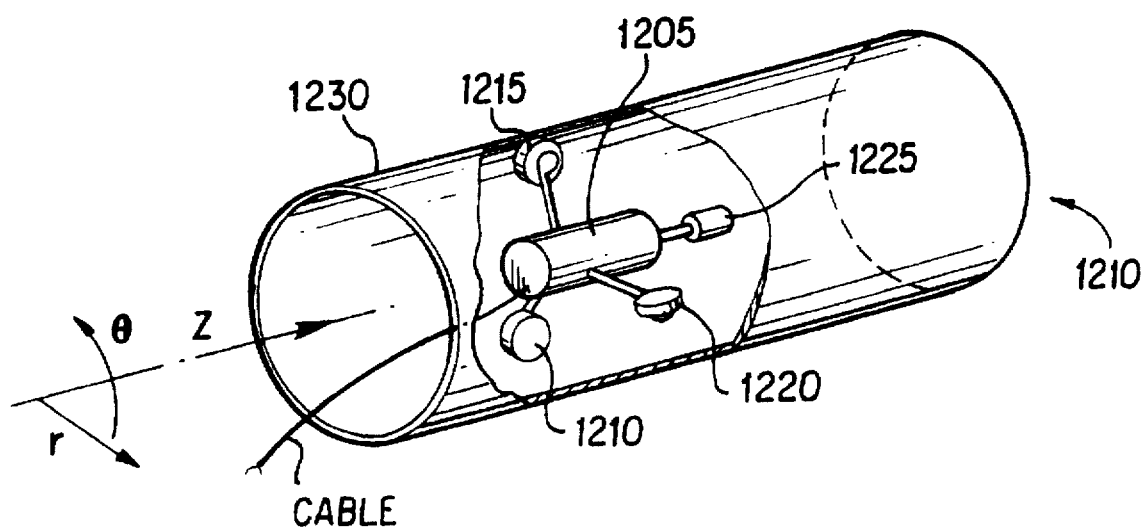
FIG. 12 illustrates a pipe-crawler robot.

FIG. 11 illustrates a pipe-crawler controller 1100 in accordance with the present invention designed for applications in a cylindrical coordinate system. One example of such a use is for controlling a pipe-crawling robot within a pipe in an industrial plant. Such a pipe-crawling robot is illustrated in FIG. 12, where a robot 1205 is supported by three legs 1210, 1215, and 1220 carries a camera or ultrasound detector 1225 for inspecting interior surfaces of a pipe 1230. Pipe-crawler controller 1100 consists of three force-sensitive sensors 1105, 1110, and 1115, each of which can detect position information is two dimensions and force. Z-position data along the cylinder is provided in response to the position of pressure along the Z-axis on sensor 1110. Theta information can be obtained from the theta position information from sensor 1110. Radial (r) information is provided by the r position of pressure applied to sensors 1105 and 1115.

Alternatively, Z-position can be responsive to the force of signals applied to sensors 1105 and 1115 in a manner similar to controller 105. Theta information can be obtained in a manner similar to that used for rotation information in controller 305. Radial information can be obtained from the force of the pressure applied to sensor 1110.

Figure 13:
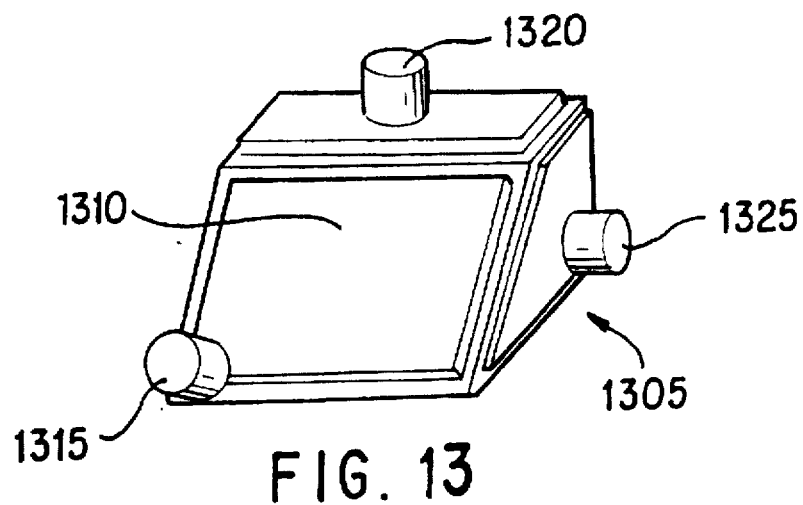
FIG. 13 illustrates a shape variation of controller 705 adapted for easy uses of a stylus.

FIG. 13 illustrates a controller 1305 having a sloped front surface adapted to be more compatible with the use of a stylus. Specifically, controller 1305 includes a inclined front sensor 1310. Position information is obtained in a manner similar to that of controller 305. The control inputs are not adjusted for the slope of the sensor, and movement of a pressure point on sensor 1310 will be interpreted identically as movement on sensor 310 of controller 305. Rotation information is provided by knobs 1315, 1320 and 1325 in a manner similar to the operation of the knobs of controller 705.

Figure 14:
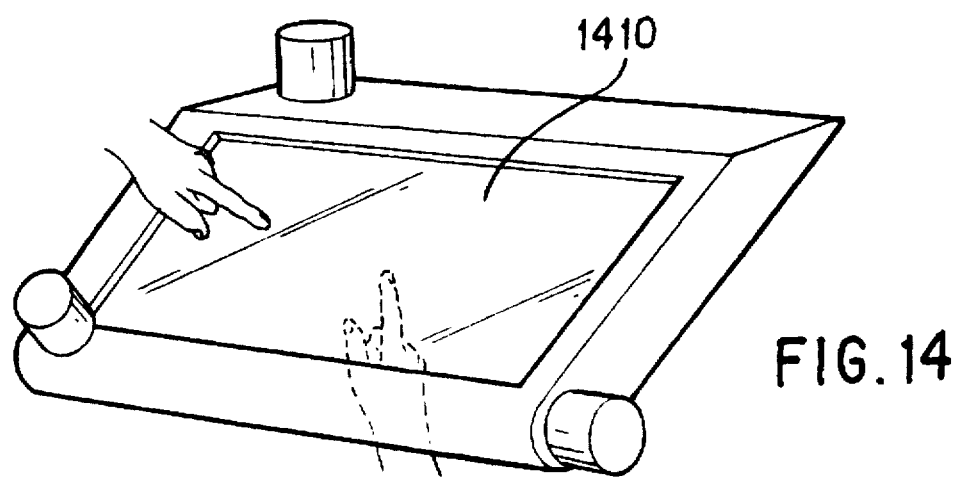
FIG. 14 illustrates a shape variation of controller 705 adapted for use with CAD/CAM digitizers.

FIG. 14 illustrates a shape variation of controller 705 with an expanded sensor 1410. This variation is adapted specifically for with in CAD/CAM digitizers.

Figure 15:
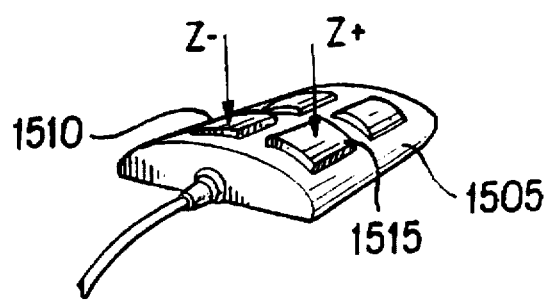
FIG. 15 illustrates the combination of two force-sensitive sensors on a mouse.

FIG. 15 illustrates the combination of two force-sensitive sensors on a mouse 1505. Mouse 1505 operates in a conventional manner to provide X-position and Y-position control signals. Force-sensitive sensor 1510 provides a signal for providing –Z information. Similarly, force-sensitive sensor 1515 provides a signal for providing +Z information.

FIG. 16 illustrates a wedge controller 1605 adapted for use in controlling a crane such as mobile crane 1705 illustrated in FIG. 17. Sensor pad 1610 provides information in the X and Y directions and a third signal in response to the force of the applied pressure. The third signal is used provide a signal to rotate the boom 1705 in a counterclockwise direction, as if pressure was applied to the right side of the boom, "pushing" it counterclockwise. X-position information from sensor 1610 controls the extension of boom end 1710. Y-position information from sensor 1610 controls the elevation of boom 1705 and boom end 1710. Sensor pad 1615 also provides information in the X and Y directions and a third signal in response to the force of the applied pressure. The third signal is used provide a signal to rotate boom 1705 in a clockwise direction, as if pressure was applied to the left side of the boom, "pushing" it clockwise. X-position information from sensor 1615 controls the movement of outrigger 1715 of the mobile crane. Y-position information from sensor 1615 controls hook cable 1720. For better understanding, the correspondence between control inputs and the operation of mobile crane 1705 is also illustrated with reference to numerals 1–5, with the numerals on controller 1605 referring to the X, Y or force of one of the two sensors, and the corresponding numeral illustrating the corresponding motion controlled with reference to mobile crane 1705.

FIG. 18 illustrates a controller 1805 adapted for use in a spherical coordinate system. Controller 1805 is in the shape of a hemisphere with a hemispherical surface 1810 and a flat bottom surface 1815. Radial information is provided in response to activation of a sensor-sensitive pad on surface 1815. Theta and phi information is provided in response to position information from a force-sensitive pad on surface 1810.

Figure 19:
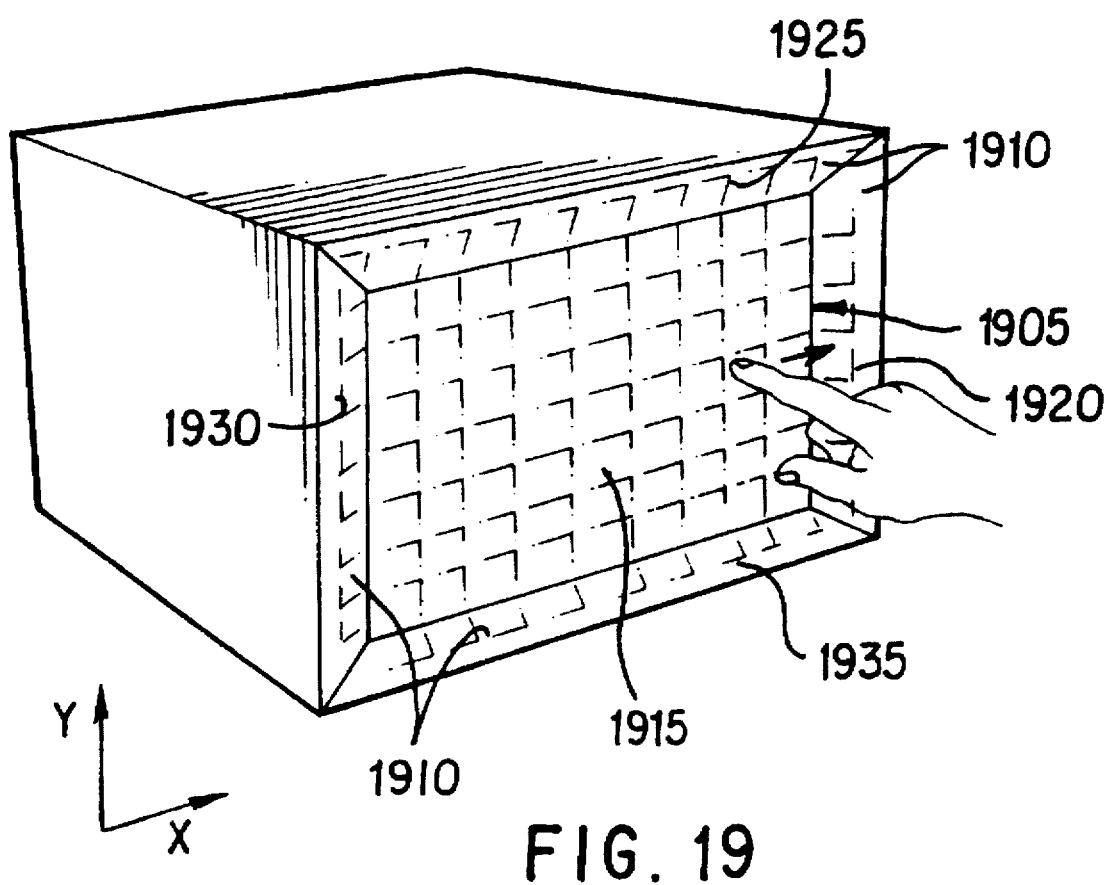
FIG. 19 illustrates a two-mode controller adapted for use in controlling an object or cursor in 2 dimensions.

FIG. 19 illustrates a controller adapted for use in controlling an object or cursor in 2 dimensions. A force-sensitive matrix sensor 1905 provides two signals, one X, and one Y, in response to the position of a force applied to the sensor. Further, sensor 1905 includes a raised area 1910 on its four edges which is tactilely distinguished from flat surface 1915 of sensor 1905 by the inclination of area 1910 relative to surface 1915. In the preferred embodiment, area 1910 includes an area at each of the four edges of surface 1915. The edges are inclined and raised relative to flat surface 1915. This provides an area of the sensor tactilely distinguished from flat surface 1915 which operates in a different mode. For example, in a relative mode for X and Y-position a change in position on sensor area 1915 is interpreted as a proportional change in cursor position. Once the operators finger reaches raised area 1910 a steady force (without movement) on raised area 1910 is interpreted as a continuation of the cursor movement. Cursor movement can be continued at either the most recent velocity along an axis, or at a preset speed, as long as a force is detected on the portion of area 1910 on that axis, such as portion 1920 with regards to movement in the positive X-direction. Alternatively, the speed of the cursor movement along an axis could be proportional to the amount of force applied to area 1910 on that axis. Thus, area 1920 would provide control of +X cursor speed, area 1925 would provide control of +Y cursor speed, area 1930 would provide control of –X cursor speed, and area 1935 would provide control of –Y cursor speed. In any case, the operator is provided with the advantages of two alternative operating modes and the ability to combine the two modes in order to continue cursor movements in a desired direction even after reaching the edge of sensor area 1915.

Figure 25A:
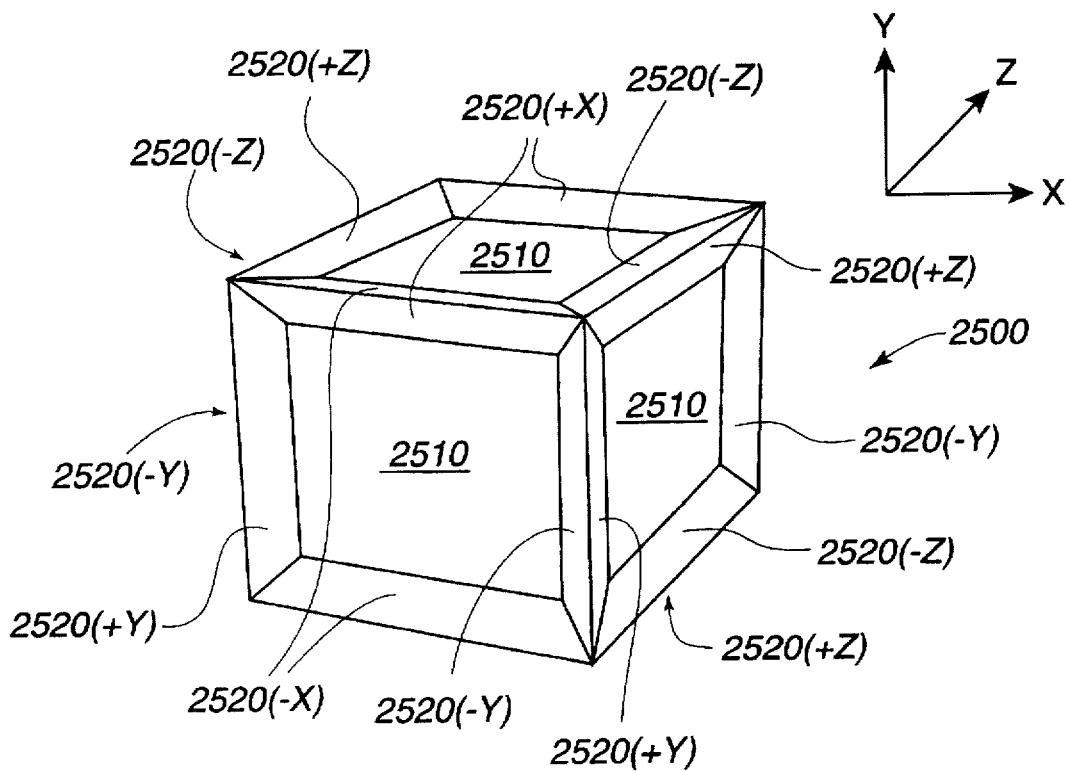
FIG. 25a illustrates a controller including 6 force-sensitive matrix sensors and 24 edge sensors.

Controller 2500 of FIG. 25a is similar to the controller illustrated in FIG. 19, except that it includes 6 force-sensitive matrix sensors 2510 and 24 edge sensors 2520. As illustrated in FIG. 25a, there are four edge sensors 2520 surrounding and immediately adjacent to each of the force-sensitive matrix sensors 2510. Three of the six matrix sensors 2510 and twelve of the twenty-four associated edge sensors 2520 are illustrated in FIG. 25a. The three matrix sensors 2510 and the twelve associated edge sensors 2520 hidden in the perspective view are identical in construction and layout to those illustrated.

Four edge sensors 2520 surround and are immediately adjacent to each of the matrix sensors 2510 so that a user's finger may move continuously from a matrix sensor 2510 to an edge sensor 2520. Each of the edge sensors 2520 is inclined and raised relative to the adjacent matrix sensor to tactilely distinguish it from the associated matrix sensor 2510. Alternatively, edge sensors 2520 could be otherwise tactilely distinguished, such as by the use a texture different from that used on the adjacent matrix sensor 2510. One function of the edge sensors 2520 is to provide a continuation command as described above with regard to the operation of FIG. 19. In addition, edge sensors 2520 may be used to provide rotation commands. Specifically, the eight edge sensors 2520($x$) parallel to the X-axis may be used to provided rotation commands about the X-axis. As illustrated in FIG. 25a, four of these edge sensors (2520–x) provide a negative rotation command. Four of these edge sensors (2520+x) provide a positive rotation command. In a similar manner, the eight edge sensors 2520$z$ parallel to the Z axis are used to provided rotation commands about the Z axis. Similarly again, the eight edge sensors 2520$y$ parallel to the Y-axis are used to provided rotation commands about the Y-axis.

Figure 25B:
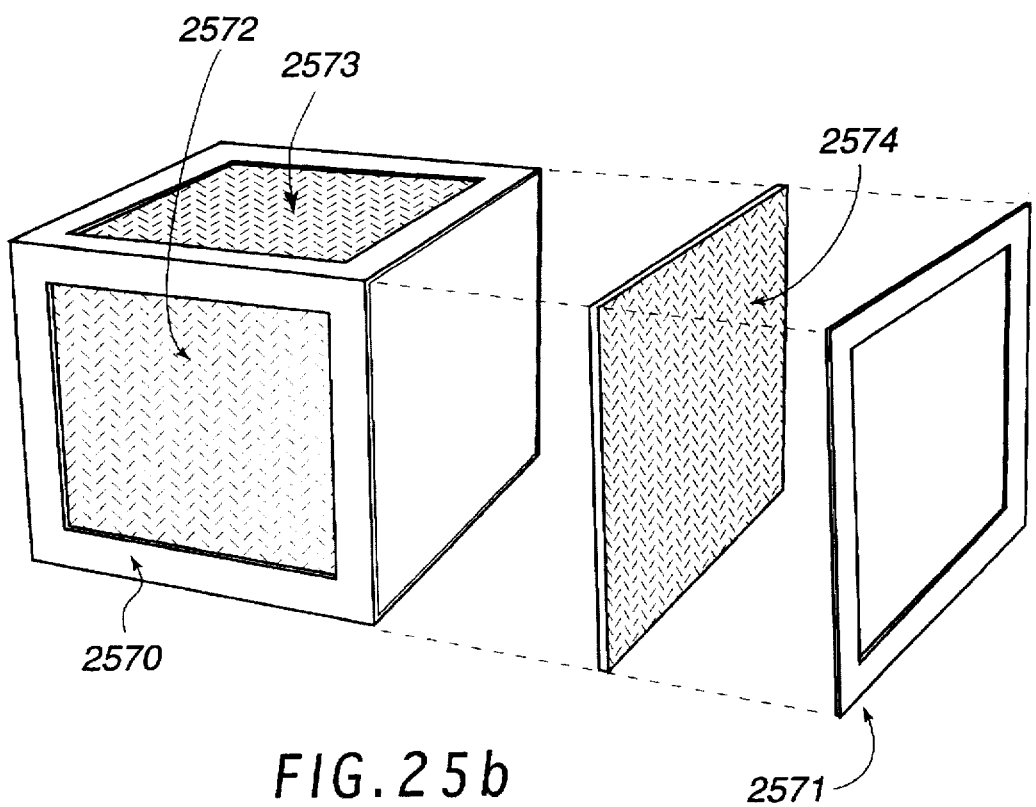
FIG. 25b illustrates an alternative controller including 6 force-sensitive matrix sensors and 24 edge sensors.

An alternative embodiment of controller 2500 is illustrated in FIG. 25b. FIG. 25b has a thin film overlays, such as 2570 and 2571, which provide a texture different from that of the sensor pads, such as 2572, 2573, and 2574. For example, the thin film overlay could be made of a sheet of polycarbonate to provide a smooth hard surface. Alternatively, thick neoprene or silicon rubber could be used to provide a soft texture.

Figures 26A, 26B:
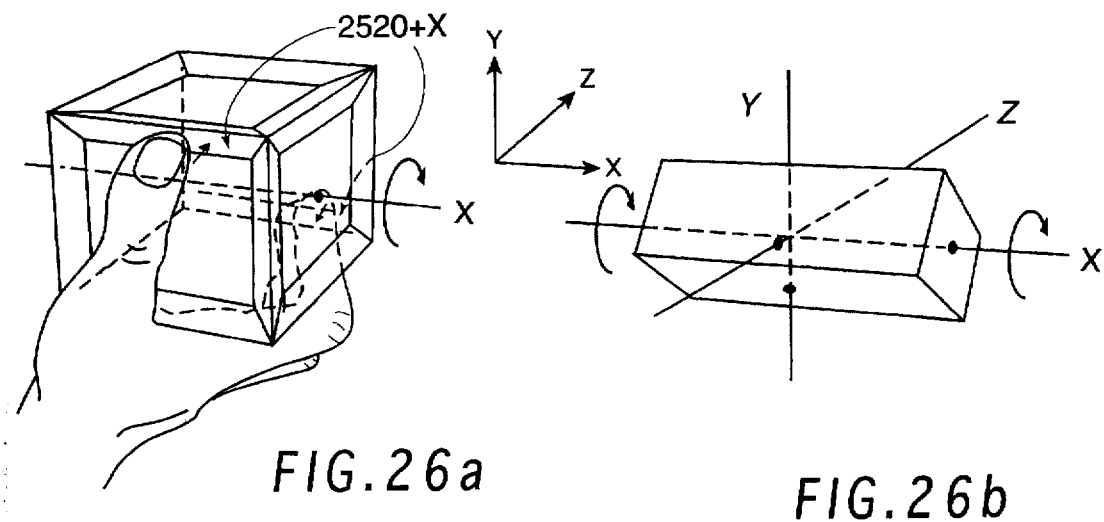
FIGS. 26a–26f illustrate the protocol for rotation command generation using the controller of FIG. 25.
Figures 26C, 26D:
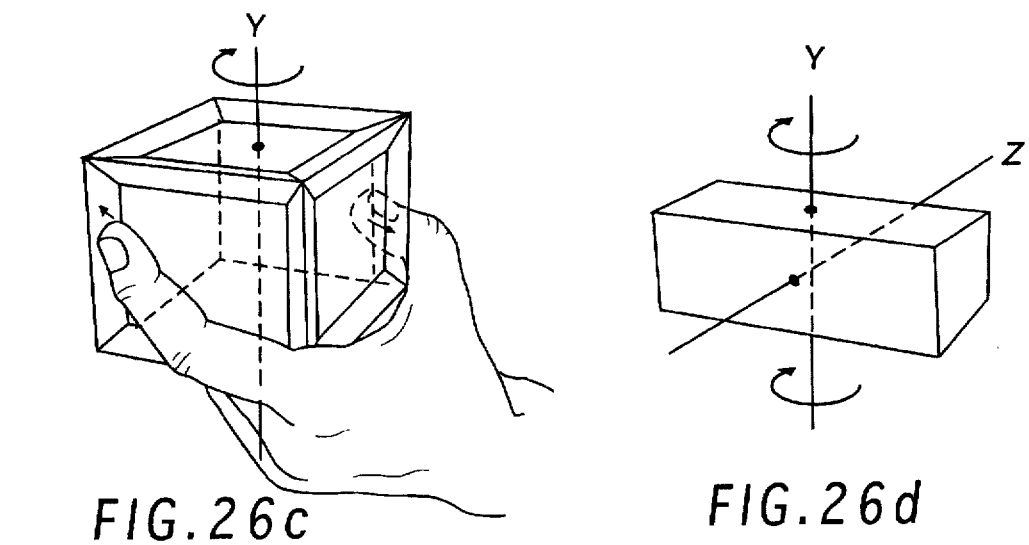
Figures 26E, 26F:
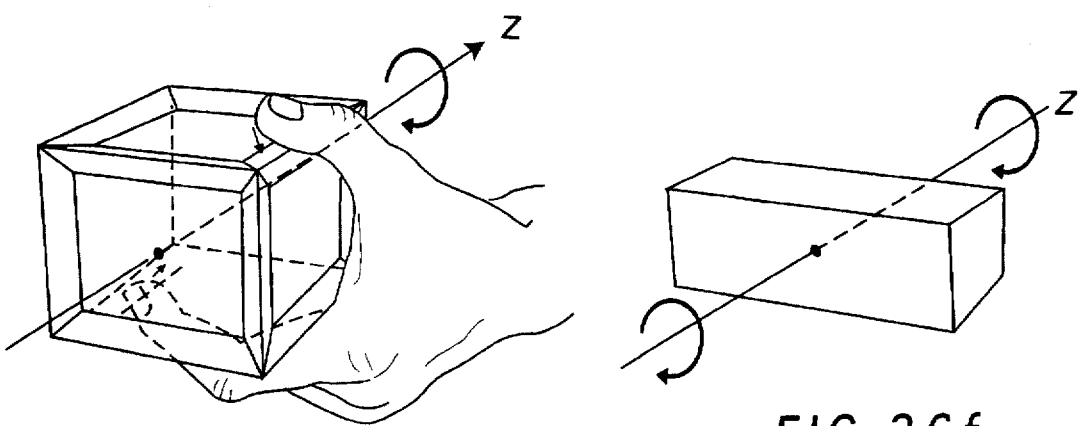

The protocol for rotation command generation is illustrated in FIGS. 26a–f. Specifically, a rotation command is generated in response to the user touching one or more of the edge sensors 2510. FIG. 26a illustrates a user touching two of the edge sensors 2520+x, resulting the generation of a positive X-axis rotation command, resulting in the rotation of a display object as illustrated in FIG. 26b. Similarly, FIG. 26c illustrates generation of a positive Y-axis rotation command, resulting in the rotation of a display object as illustrated in FIG. 26d. Similarly again, FIG. 26e illustrates generation of a positive Z-axis rotation command, resulting in the rotation of a display object as illustrated in FIG. 26f. Both positive and negative rotations are provided in response to the detection of touch on the appropriate sensor edges 2520. Further, the magnitude of the force applied to the sensors is preferable proportional to the amplitude of the rotation signal, such that a more powerful force on the edge sensors 2520 is interpreted as a more rapid rotation.

Rotation commands are distinguished from translation commands by determining if a touch on a matrix sensor 2510 at a position immediately adjacent to an edge sensor 2520 occurred immediately prior to or simultaneously with the initiation of the touch of an edge sensor 2520. If touch points are detected on an edge sensor 2520 and on a matrix sensor 2510, and the touch points are continuous in time and position, the user's intention is interpreted as a continuation of translation command. If touch points are detected on edge sensors 2520 only, without a prior and adjacent detection on the adjacent matrix sensor, then the magnitude of force signal on the edge will be interpreted as a rotational command. It is preferable that a certain amount of "hysterisis" is provided in the command interpretation, such that if a user partially touches a matrix sensor 2510 while applying a rotation gesture it is not interpreted as a continuation of a translation command. This is easily done, as a continuation of a translation command cannot occur unless a translation command had been previously provided, and that previous translation command is smoothly continued by the candidate continuation command. This is described more fully below in the section titled Gesture Interpretation.

The rotation and continuous-translation input modes are very intuitive. The rotation mode is especially intuitive because the user's push action (one finger) or "twisting gesture" (pushing two different edge by two fingers) of edges causes the displayed (or controlled) object to rotate in the pushing/twisting direction.

Rotation commands about an arbitrary axis may also be generated using controller 2500' similar to the controller 2500 illustrated in FIG. 25a. Specifically, in this alternative embodiment, edge sensors 2520 are replaced with edge sensors 2520' capable of providing a signal responsive to the position at which they are touched. For example, edge sensors 2520 along the X-axis provide a signal corresponding to the position along the X-axis at which a touch occurs. Similarly, the edge sensors 2520' along the Y- (and Z-) axis provides a signal corresponding to the position along the Y- (and Z-) axis.

Figure 27:
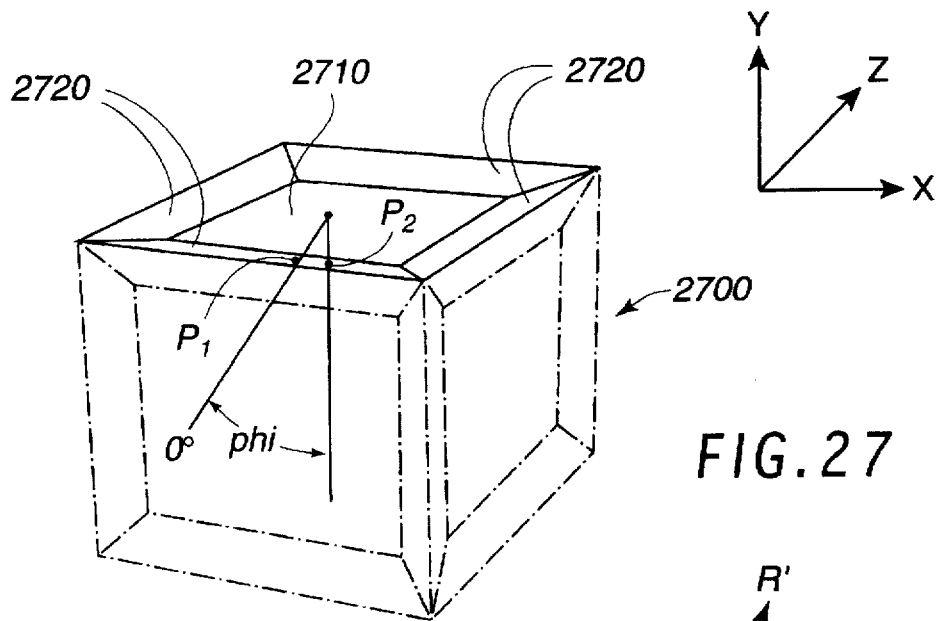
FIG. 27 illustrates a matrix sensor and four edge sensors used to detect rotation about an arbitrary axis in the X–Z plane.

Referring to FIG. 27, an illustration of the matrix sensor 2710 on top of controller 2700 in the X-Z plane, and the 4 edge sensors 2720 immediately adjacent to it, if a touch is detected at the position "P1" indicated by "0 degrees" on edge sensor 2720, a rotation command is generated corresponding to a rotation about the X-axis. However, a touch detected at an arbitrary position "P2" on edge sensor 2710 is interpreted as a rotation about the X' axis, where the X' axis is shifted by the same angle "phi" which corresponds to the angular displacement of point P2 from the 0 degree reference position P1. Thus, a single touch point is converted to a rotation about an arbitrary axis in the X-Z plane. Similar interpretation of touches on the edge sensors 2720 immediately adjacent to the matrix sensors 2710 in the Y-Z and X-Y planes provide rotation commands about arbitrary Y' axes in the X-Y plane and arbitrary Z' axes in the Y-Z plane respectively.

Figure 28A:
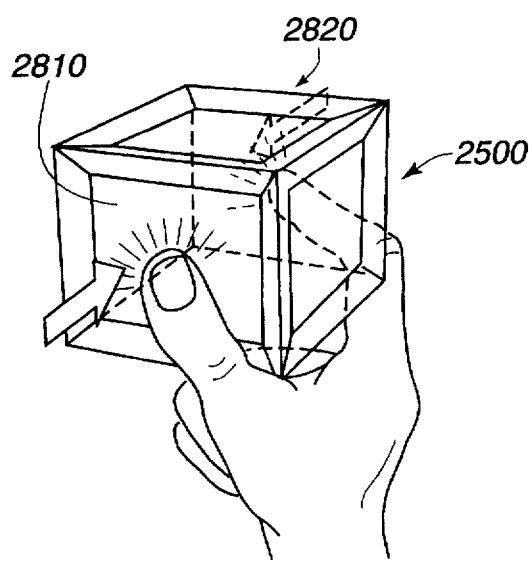
FIGS. 28a–28f illustrate the protocol for grasp-move gestures in conjunction with the controller of FIG. 25.
Figure 28B:
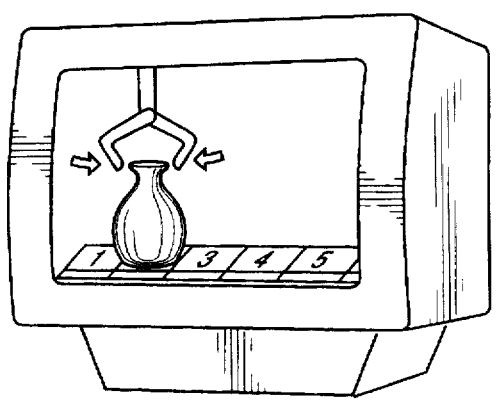
Figure 28C:
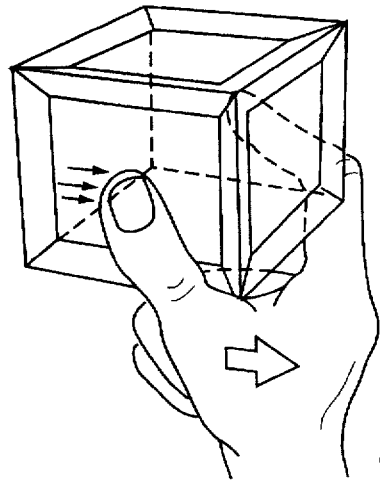
Figure 28D:
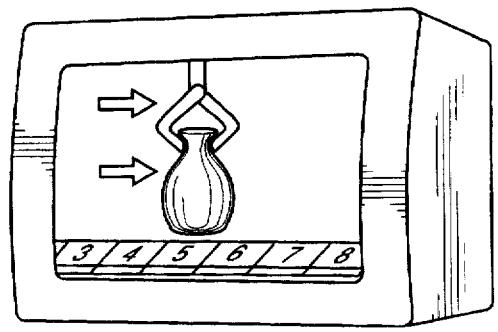
Figure 28E:
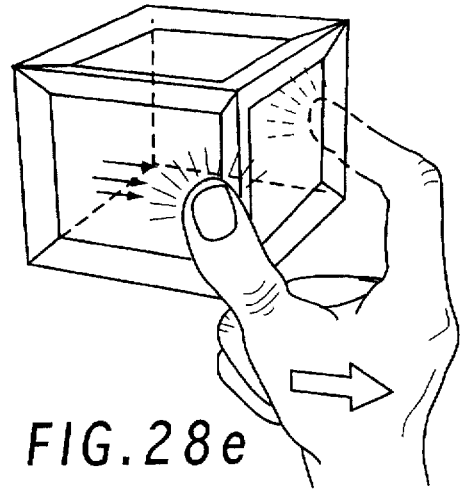
Figure 28F:
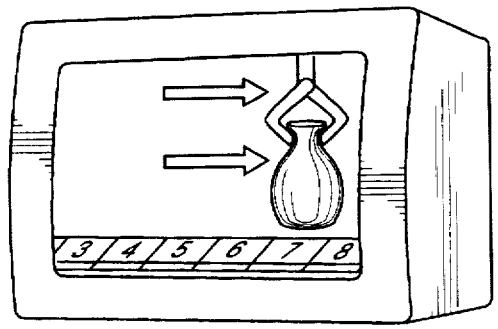

FIG. 28a illustrates the use of a grasp/move gesture in conjunction with controller 2500 of FIG. 25a. As illustrated, a user simultaneously touches matrix sensors 2810 and 2820 located on opposite sides of touch cube 2500. The two opposing signals are interpreted as a "grasp" command for a displayed (or controlled) object in the Y-Z plane, as illustrated in FIG. 28b. In this grasp/move mode, the force signal could be used as "remain-in-position" command (integral value of force signal is used as command) or as "spring return" type command (magnitude of force signal for each time step is used as command). After grasping the displayed (or controlled) object, the user may generate a translation command by dragging the touch points on panels 2810 and 2820, as illustrated in FIG. 28c. This gesture is interpreted as a simultaneous translation while maintaining the grasp command, as illustrated in FIG. 28d. When the touch points reach the edge of the matrix sensors, the user may continue to move the displayed (or controlled) object because the force signal detection by the edge sensors is interpreted as the continuation of translation command, as illustrated in FIGS. 28e and 28f. Similarly, touches on the other panels provide commands for the X-Y and Y-Z planes.

Figure 29A:
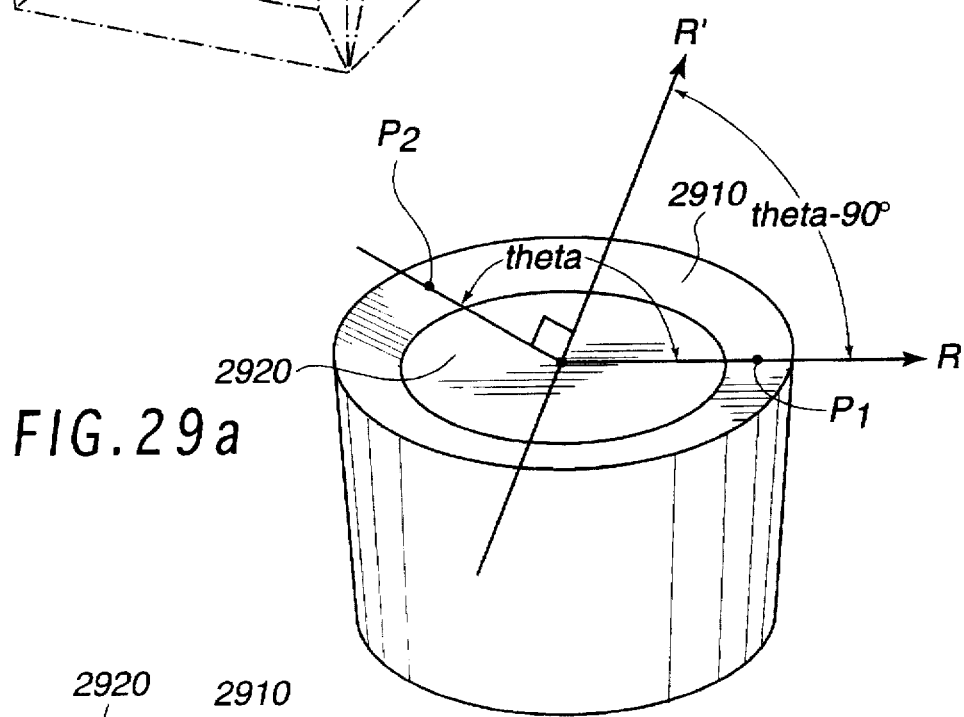
FIGS. 29a and 29b illustrate an alternative cylinder controller.
Figure 29B:
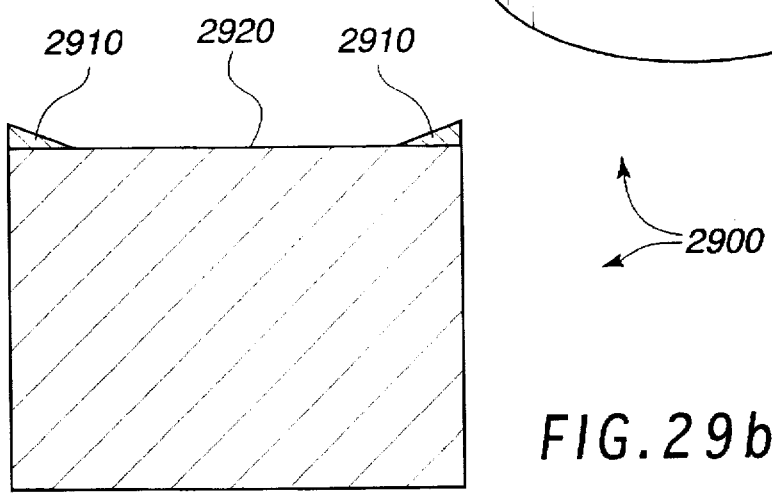

An alternative embodiment of the cylinder of FIG. 11 is illustrated in FIGS. 29a and 29b. As illustrated, cylinder 2900 includes a edge sensor 2910 raised and inclined relative to the flat matrix sensor 2920. Rotation and translation continuation commands are generated in the same manner as have been described with reference to controller 2500. For example, when a user pushes edge sensor 2910 at point P2, located at an angle is theta relative to a reference position P1, the displayed (or controlled) controlled is rotated about axis R', where the axis R' is in the plane of on the top surface 2920 of cylinder 3000 and shifted theta-90 degrees from reference axis R, where theta is the angle defined by the points P1 and P2 as illustrated.

Gesture Interpretation:

Gestures applied to the controllers, such as controllers 2500 and 2500', may be interpreted in a number of different ways by a computer interface and used to control the movement of display objects on an interactive computer display or used to control the movement of a physical piece of equipment, such as an industrial crane. The interpretation of gestures can be broken down into 3 cases.

Figure 30:
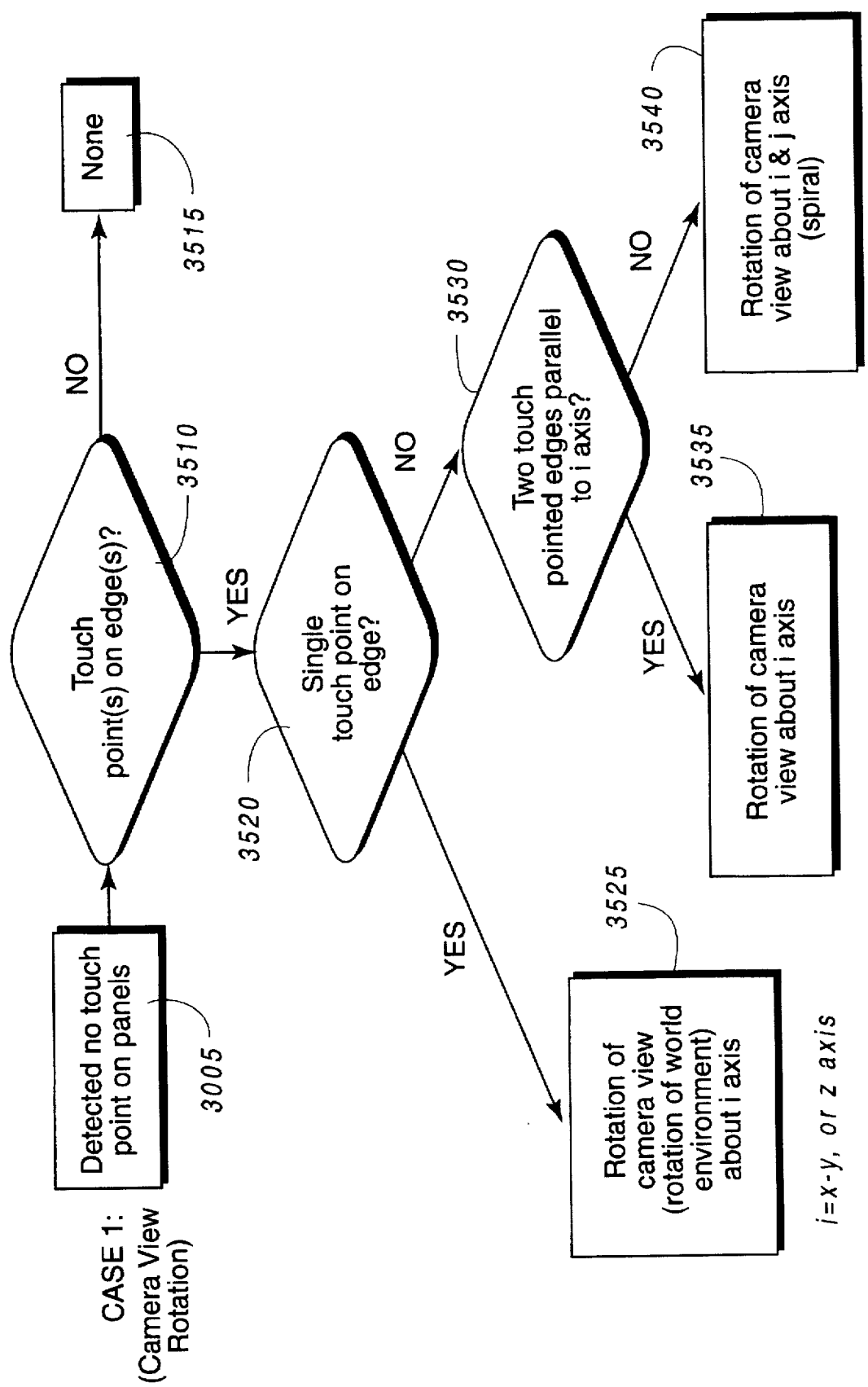
FIG. 30 illustrates the interpretation of touch points on a controller when there is no detection of touches on the matrix-sensors.

In case 1, there is no detection of touches on matrix-sensors 2510, however there is detection of touch on edge sensors 2520. This case is interpreted as rotation of the camera view, as illustrated in the flow chart of FIG. 30. Referring to FIG. 30, step 3005 is the entry point for the logic executed when no touch points are detected on matrix panels 2510. In step 3510, a test is conducted to determine if there are any touch points on edge sensors 2520. If no, the logic is exited in step 3515. If yes, step 3520 tests whether there are single touch points on edge sensors 3520. If yes, the camera view is rotated in step 3525. If no, a test is conducted in step 3530 to determine if two touch points occur on parallel edge sensors. If yes, the camera view is rotated about the appropriate axis in step 3535. If no, the camera view is simultaneously rotated about the two indicated axes in step 3540.

Figure 31:
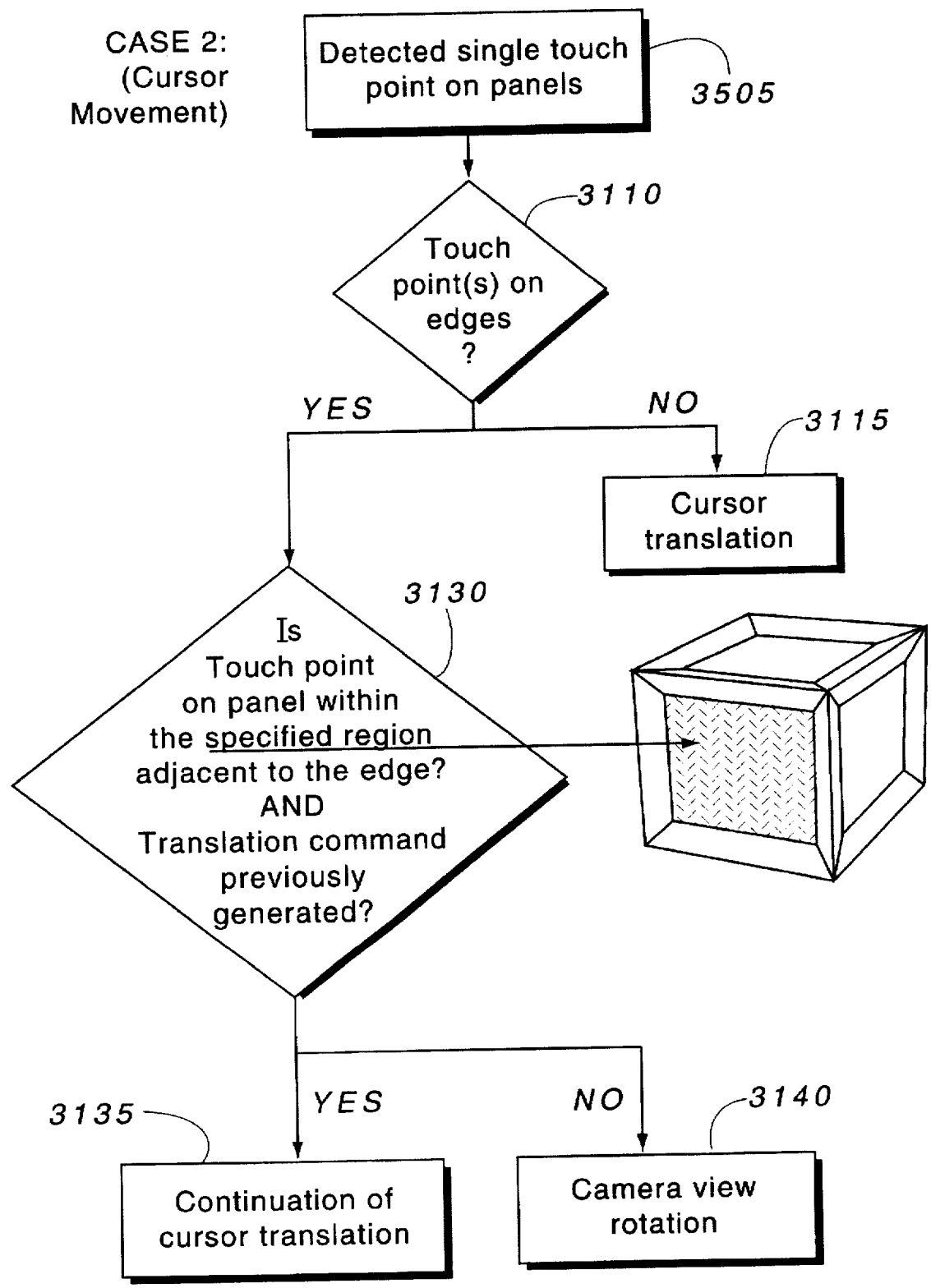
FIG. 31 illustrates the interpretation of touch points on a controller when there is a detection of a single touch point on a matrix-sensor.

In case 2, there is a detection of a single touch on matrix-sensors 2520. This case is interpreted as a cursor manipulation or camera view rotation as illustrated in the flow chart of FIG. 31. Referring to FIG. 31, step 3105 is the entry point for the logic executed when a single touch point is detected on matrix sensors 2510. In step 3110 a test is made to determine whether there are any touch points on any of the edge sensors 2520. If no, the touch point is interpreted as a cursor translation in step 3115. If yes, a test is made in step 3130 to determine whether the touch point on matrix panel 2510 is within a specified region adjacent to the edge sensor 2510 and whether a translation command has been just previously generated. If yes, the gesture is interpreted as a continuation of the cursor translation in step 3135. If no, the gesture is interpreted as a camera view rotation in step 3140.

Figure 32:
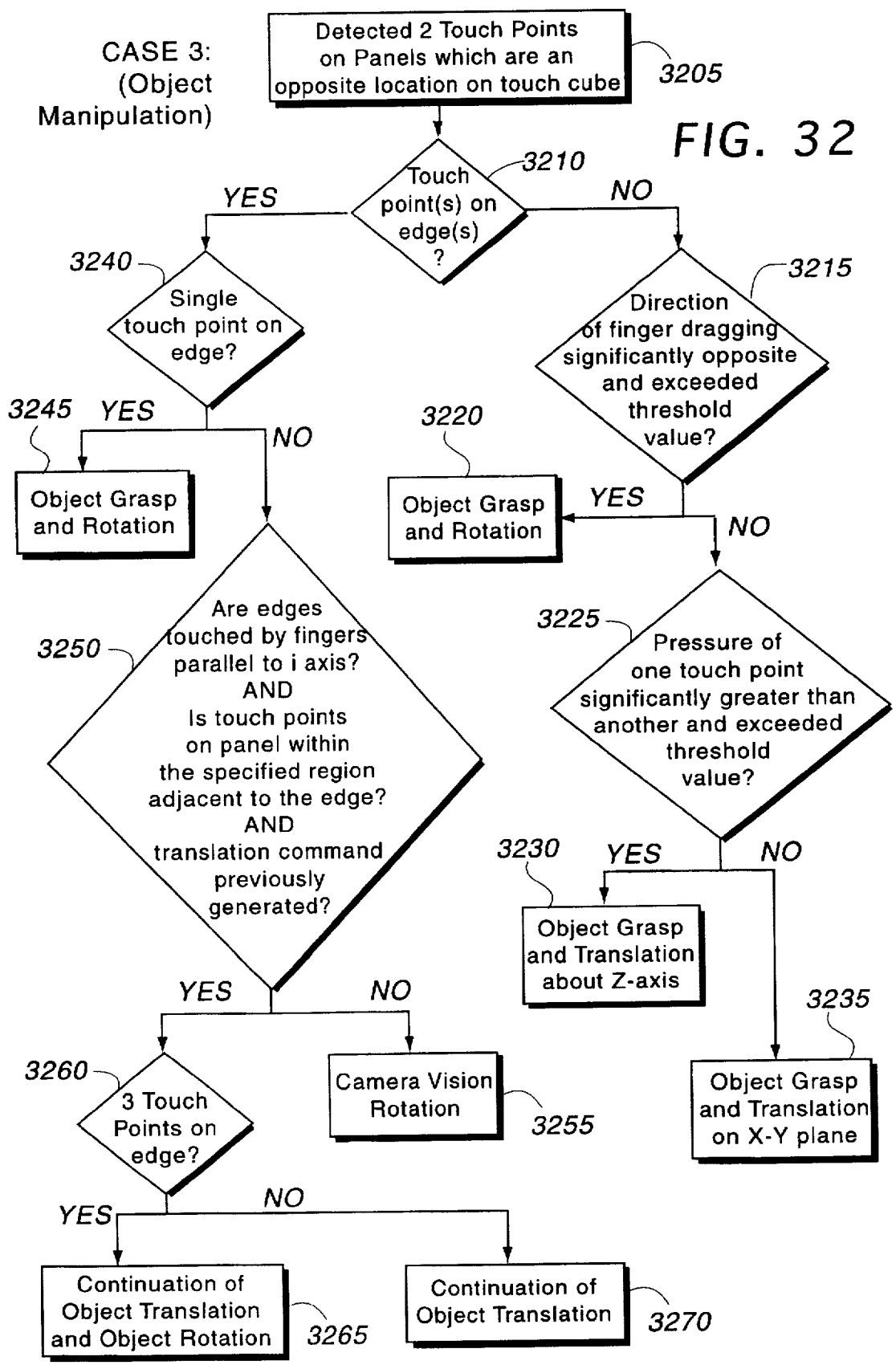
FIG. 32 illustrates the interpretation of touch points on a controller when there is a detection of multiple touch point on matrix-sensors.

In case 3, there is a detection of multiple touch points on matrix sensors 2520. This case is interpreted as an object manipulation as illustrated in the flow chart of FIG. 32. Referring to FIG. 32, step 3205 is the entry point for the logic executed when multiple touch points are detected on matrix sensors 2520. In step 3210, a test is made to determine if any touch points are detected on edge sensors 2520. If no, a test is made in step 3215 to determine if the finger dragging is occurring is significantly opposite directions and the touch pressure exceeds a threshold value. If yes, the gesture is interpreted as object grasp and rotation in step 3220. (This gesture and its interpretation are illustrated in FIGS. 33e1 and 33e2.) If no, a test is made in step 3225 to determine if pressure on one touch point is significantly greater than another and exceeds the threshold value. If yes, the gesture is interpreted as an object grasp and translation about the Z axis in step 3230, as illustrated in FIGS. 33d1, 33d2, 33d3 and 33d4. If no, the gesture is interpreted as an object grasp and translation on the X–Y plane in step 3235, as illustrated in FIGS. 33d1 and 33d2.

Returning to step 3210, if touch points are detected on edge sensors 2520, a test is made in step 3240 to determine if there is only one touch point on edge sensor 2520. If yes, the gesture is interpreted as an object grasp and rotation in step 3245, as illustrated in FIGS. 33b1 and 33b2. If no, a test is made in step 3250 to determine if the edges touched are parallel and if the touch points on the matrix panel 2510 are within a specified region adjacent to the edge and whether there was a translation command just previously generated. If these test are not all met, the gesture is interpreted as a camera view rotation in step 3255. If the conditions of step 3250 are met, a test is made in step 3260 to determine if three touch points occur on edge sensors 2520. If yes, the gesture is interpreted as a continuation of object translation and object rotation in step 3265, as illustrated in FIGS. 33c1 and 33c2. If no, the gesture is interpreted as a continuation of object translation in step 3270.

The controllers described in FIGS. 1–10, 13 and 14 are adapted for use in the Cartesian coordinate system. In general, they can be categorized by the modes used for position and rotation control. Specifically, a "push mode" for position control is used in the embodiments described with reference to FIGS. 1, 8, and 9a. In contrast, a "drag mode" for position is used in the embodiments described with reference to FIGS. 3, 6, 7, and 10a–c. With regards to rotation, three general modes are used. "Gesture" mode for rotation is used in the embodiments described with reference to FIGS. 3 and 6. "Push mode" or "torque mode" for rotation is used in the embodiments described with reference to FIGS. 9a–d. Finally a "twist mode" for rotation is used in the embodiments described with reference to FIGS. 7 and 8. These modes can be combined in a number of ways as taught by the various embodiments. Further, different modes can be adapted to the cylindrical and spherical controllers taught with reference to FIGS. 11, 12, 16 and 18.

Figure 34:
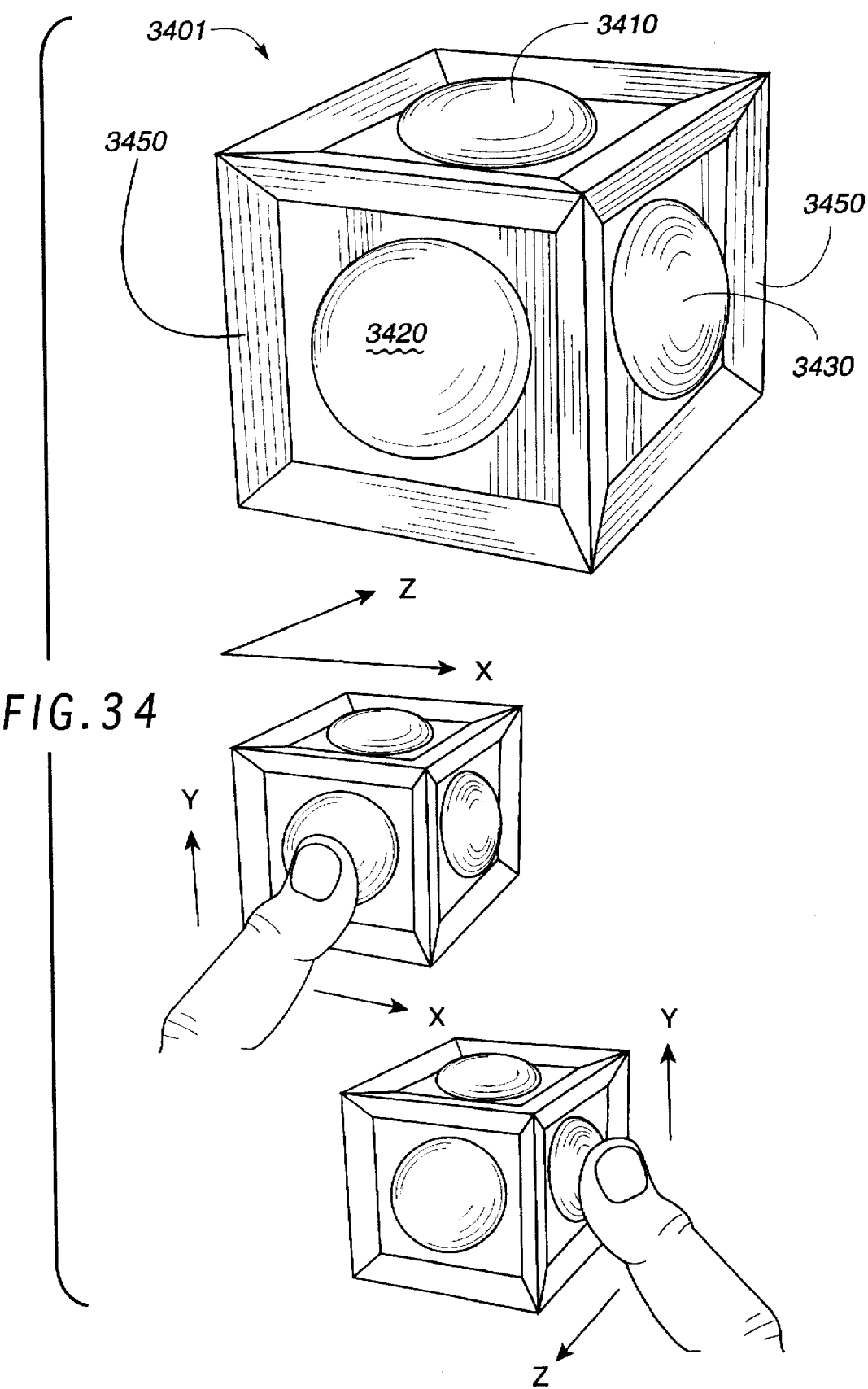
FIG. 34 is a perspective view of a controller incorporating trackballs to control the positional movements and edge sensors to control the rotational movements of an object.

FIG. 34 illustrates an alternative design of a controller incorporating multiple trackballs and force sensitive edge sensors. This embodiment supports the "drag mode" of translation commands by the use of trackballs 3410, 3420, and 3430. Specifically, trackball 3420 on the front "X–Y" surface of cube 3401 is used to generate translation commands of in the X–Y plane. Trackball 3410 located on the "Y–Z" surface of controller 3401 is used to generate translation commands in the Y–Z plane. Finally, trackball 3410 on the "X–Z" surface of controller 3401 is used to generate translation commands in the X–Z plane. Rotation commands are generated as before, by the use of force sensitive edge sensors 3450. As previously described, this can be implemented in either the "push" or "twist" mode.

Accordingly, while the invention has been particularly taught and described with reference to the preferred embodiments, those versed in the art will appreciate that minor modifications in form and details may be made without departing from the spirit and scope of the invention. For example, the embodiments variously describe the derivation of information from single or multi-bit sensor and A/D converter combinations. It should be well understood that these could be used interchangeably as would best fit the application. Further, while the sensors on the Cartesian controllers are generally aligned on and orthogonal relative to axes, as illustrated in FIGS. 1 and 3, these sensors can also be inclined as illustrated in FIG. 13, and still are considered to be generally aligned and orthogonal to the axes. Accordingly, all such modifications are embodied within the scope of this patent as properly come within my contribution to the art and are particularly pointed out by the following claims.

I claim:

1. A touch-sensitive manually operable controller for providing positive and negative control information relative to each of three axes, the controller having six touch-sensitive sensors mounted on its outer surface, the sensors oriented to detect manual touches on the outer surface, two sensors mounted on opposing sides of the controller relative to each axis of a Cartesian coordinate system, the controller providing positive X-axis control information in response to touch pressure applied in the positive X direction to a first sensor mounted parallel to a Y–Z plane, and providing Y-axis and Z-axis control information in response to translation of the touch pressure on the first sensor in the Y axis and Z-axis directions, respectively, providing negative X-axis control information in response to touch pressure applied in the negative X direction to a second sensor mounted parallel to the Y–Z plane, and providing Y-axis and Z-axis control information in response to translation of the touch pressure applied to the second sensor in the Y axis and Z-axis directions, respectively, providing positive Y-axis control information in response to touch pressure applied in a positive Y direction to a third sensor mounted parallel to an X–Z plane, and providing X-axis and Z-axis control information in response to translation of the touch pressure applied to the third sensor in the X axis and Z-axis directions, respectively, providing negative Y-axis control information in response to touch pressure applied in a negative Y direction to a fourth sensor mounted parallel to the X–Z plane, and providing X-axis and Z-axis control information in response to translation of the touch pressure applied to the fourth sensor in the X axis and Z-axis directions, respectively, providing positive Z-axis control information in response to touch pressure applied in a positive Z direction to a fifth sensor mounted parallel to an X–Y plane, and providing X-axis and Y-axis control information in response to translation of the touch pressure applied to the fifth sensor in the X axis and Y-axis directions, respectively, and providing negative Z-axis control information in response to touch pressure applied in a negative Z direction to a sixth sensor mounted parallel to the X–Y plane, and providing X-axis and Y-axis control information in response to translation of the touch pressure applied to the sixth sensor in the X axis and Y-axis directions, respectively.

2. A touch-sensitive manually operable controller as in claim 1 for use as an input device for an interactive graphics computer.

3. An interactive graphics computer system including the controller of claim 1, wherein the apparent position of an object in the display is changed to correspond to the control information provided by the controller.

4. A touch-sensitive manually operable controller as in claim 1 for use as an input device for heavy equipment.

5. Heavy equipment including the controller of claim 1, wherein the position of a member of the heavy equipment is moved to correspond to the control information provided by the controller.

6. A touch-sensitive manually operable controller as in claim 1 wherein the positive and negative X-axis control information, the positive and negative Y-axis control information, or the positive and negative Z-axis control information, when provided without the control information for said translation, are provided to a computer system to rotate a controlled object about the X-axis, the Y-axis, or the Z-axis, respectively.

7. A touch-sensitive manually operable controller as in claim 1 wherein the Y-axis and Z-axis control information, the X-axis and Z-axis control information, or the X-axis and Y-axis control information provided in response to said translation are provided to a computer system to translate a controlled object along one or more of said axes.

8. A touch-sensitive manually operable controller as in claim 1 wherein each of said sensors includes a central sensor and a plurality of edge sensors disposed about the periphery of said central sensor.

9. A method for controlling a three-dimensional display of an interactive graphical computer by use of a three-dimensional controller, the method including the steps of:

providing a three-dimensional display of an object;

detecting a touch applied to the controller in a positive X-direction relative to a Cartesian coordinate system centered on the controller and changing the display to correspond to a positive X-movement of the object within the display coordinate system in response;

detecting a touch applied to the controller in a negative X-direction relative to a Cartesian coordinate system centered on the controller and changing the display to correspond to a negative X-movement of the object within the display coordinate system in response;

detecting a touch applied to the controller in a positive Y-direction relative to a Cartesian coordinate system centered on the controller and changing the display to correspond a positive Y-movement of the object within the display coordinate system in response;

detecting a touch applied to the controller in a negative Y-direction relative to a Cartesian coordinate system centered on the controller and changing the display to correspond to a negative Y-movement of the object within the display coordinate system in response;

detecting a touch applied to the controller in a positive Z-direction relative to a Cartesian coordinate system centered on the controller and changing the display to indicate a positive Z-movement of the object within the display coordinate system in response;

detecting a touch applied to the controller in a negative Z-direction relative to a Cartesian coordinate system centered on the controller and changing the display to correspond to a negative Z-movement of the object within the display coordinate system in response;

detecting a translational change in a positive X-direction of a touch applied to the controller, a pressure of said touch being directed in a positive Y-direction, a negative Y-direction, a positive Z-direction, or a negative Z-direction relative to a Cartesian coordinate system centered on the controller and changing the display to correspond to a positive X-movement of the object within the display coordinate system in response;

detecting a translational change in a negative X-direction of a touch applied to the controller, a pressure of said touch being directed in a positive Y-direction, a negative Y-direction, a positive Z-direction, or a negative Z-direction relative to a Cartesian coordinate system centered on the controller and changing the display to correspond to a negative X-movement of the object within the display coordinate system in response;

detecting a translational change in a positive Y-direction of a touch applied to the controller, a pressure of said touch being directed in a positive X-direction, a negative X-direction, a positive Z-direction, or a negative Z-direction relative to a Cartesian coordinate system centered on the controller and changing the display to correspond to a positive Y-movement of the object within the display coordinate system in response;

detecting a translational change in a negative Y-direction of a touch applied to the controller, a pressure of said touch being directed in a positive X-direction, a negative X-direction, a positive Z-direction, or a negative Z-direction relative to a Cartesian coordinate system centered on the controller and changing the display to correspond to a negative Y-movement of the object within the display coordinate system in response;

detecting a translational change in a positive Z-direction of a touch applied to the controller, a pressure of said touch being directed in a positive X-direction, a negative X-direction, a positive Y-direction, or a negative Y-direction relative to a Cartesian coordinate system centered on the controller and changing the display to correspond to a positive Z-movement of the object within the display coordinate system in response; and detecting a translational change in a negative Z-direction of a touch applied to the controller, a pressure of said touch being directed in a positive X-direction, a negative X-direction, a positive Y-direction, or a negative Y-direction relative to a Cartesian coordinate system centered on the controller and changing the display to correspond to a negative Z-movement of the object within the display coordinate system in response.

10. A touch-sensitive manually operable controller for providing control signals in two dimensions, the controller being generally in the shape of a cube having six sides and comprising:

six generally planar touch-sensitive central sensors, each of the sensors disposed centrally on one of the sides of the controller such that two sensors are perpendicular to each of the three axes of a Cartesian coordinate system and for providing first control signals responsive to the position of touches applied to the central sensors, the first control signals defining the position of the touch in two dimensions; and six touch-sensitive edge sensors tactilely distinguished from the central sensors, each of the edge sensors being positioned on a different side of the controller about the periphery of one of the central sensors, the edge sensors providing second control signals in response to touches applied to the edge sensors.

11. A touch-sensitive manually operable controller as in claim 10 wherein each edge sensor is inclined and raised relative to the central sensor on the side of the edge sensor.

12. A touch-sensitive manually operable controller as in claim 10 wherein each edge sensor further distinguishes between touches applied to different positions on the edge sensor.

13. A touch-sensitive manually operable controller as in claim 12 wherein each edge sensor is inclined and raised relative to the central sensor on the side of the edge sensor.

14. A touch-sensitive manually operable controller as in claim 10 wherein the edge sensors further distinguish between forces applied to different positions on the edge sensor.

15. A method of moving a displayed or actual object using a controller as in claim 8, including the steps of:

moving the object in response to detection of movement of a touch point on one of the central sensors;

sensing a touch on one of the edge sensors as a continuation of a movement of touch points on the central sensor; and continuing the movement of the object as long as the touch on the edge sensor is maintained.

16. A method of manipulating a displayed or actual object using a controller as in claim 10, the method comprising the steps of:

detecting touches on two parallel edge sensors; and rotating the displayed or actual object about an object axis that corresponds to an axis parallel to the two edge sensors.

17. A method of manipulating a displayed or actual object using a controller as in claim 10, the method comprising the steps of:

detecting touch on one edge sensor; and rotating the displayed or actual object about an object axis that corresponds to an axis parallel to the edge sensor.

18. A touch-sensitive manually operable controller as in claim 10 wherein said edge sensors each include four individual edge sensors, each of said four individual edge sensors being aligned along an edge of said controller.

19. A method of manipulating a displayed or actual object using a touch-sensitive manually operable controller for providing control signals in two dimensions, the controller comprising a six generally planar touch-sensitive sensors, each sensor for providing signals responsive to the position of a touch applied to the sensor, the signals defining the position of the touch in two dimensions, two of the sensors aligned with each of the three axes of a Cartesian coordinate system such that each of said three axes perpendicularly extends through two of said sensors, the method comprising the steps of:

detecting movement of touch positions on opposing sensors;

detecting that the movement is in substantially opposite directions; and rotating the displayed or actual object.

20. A method as recited in claim 19 wherein said rotation step is accomplished only if a pressure of said touch positions is above a predetermined threshold pressure.

21. A method as recited in claim 19 further comprising the steps of:

detecting a pressure of two touch positions on opposing sensors;

translating the displayed or actual object in a direction corresponding to the direction of greater pressure.

22. A method as recited in claim 21 wherein said translation step is accomplished only if at least one of said pressures is greater than a threshold.

23. An input device for an interactive graphical computer including six touch-sensitive generally planar sensors mounted symmetrically on the outer surface of the device, two of the sensors aligned with a Y–Z plane of a Cartesian coordinate system, two of the sensors aligned with an X–Z plane, and two aligned on with an X–Y plane, all six sensors oriented to detect touch pressure directed toward a surface of the sensor and to detect translational movement of the touch pressure along the surface of the sensors and for providing control signals indicative of the location of the touch pressure on said sensor, the direction of the movement of the touch pressure on said sensor, and the magnitude of the touch pressure applied to said sensor.

24. A method for controlling an object in three dimensions using a controller having six planar sides, two of said sides perpendicular to each of the three axes of a Cartesian coordinate system, wherein each of said sides includes a generally planar touch-sensitive central sensor disposed centrally on said side of the controller, and at least one touch-sensitive edge sensor tactilely distinguished from the central sensor and positioned about the periphery of the central sensor, said method comprising the steps of:

providing a translation command to a computer system to translate said object when pressure is applied to at least one of said central sensors; and providing a rotation command to said computer system to rotate said object when pressure is applied to at least one of said edge sensors.

25. A method as recited in claim 24 wherein said translation command is provided when pressure is simultaneously applied to opposing central sensors, wherein said translation command commands said object to translate in a direction corresponding to a direction of said pressure having a greater magnitude.

26. A method as recited in claim 25 wherein said translation command is provided when pressure is simultaneously applied to opposing central sensors at two touch points and said two touch points are simultaneously translated on the surface of said opposing central sensors, wherein said translation command commands said object to translate in a direction corresponding to a direction of said touch points on said central sensors.

27. A method as recited in claim 24 wherein said rotation command is provided when pressure is simultaneously applied to parallel and diagonally opposing edge sensors, wherein said rotation command commands said object to rotate about an axis of said object that corresponds to an axis parallel to said parallel edge sensors.

28. A method as recited in claim 24 further comprising a step of providing said rotation command when movement of touch positions on opposing central sensors is detected and when said movement is in substantially opposite directions.

* * * * *

UNITED STATES PATENT AND TRADEMARK OFFICE
CERTIFICATE OF CORRECTION

PATENT NO. : 5,729,249
DATED : March 17, 1998
INVENTOR(S) : Yasutake

It is certified that error appears in the above-identified patent and that said Letters Patent is hereby corrected as shown below:

Column 5, line 27, after "33d2", insert --33d3, 33d4, 33d5, 33d6--

Column 11, line 64, change "operators" to --operator's--

Signed and Sealed this

Eighth Day of December, 1998

Attest:

BRUCE LEHMAN

*Attesting Officer*

*Commissioner of Patents and Trademarks*